United States Patent
Ikuta

(10) Patent No.: US 9,581,757 B2
(45) Date of Patent: Feb. 28, 2017

(54) LIGHTING DEVICE, DISPLAY DEVICE AND TELEVISION DEVICE

(71) Applicant: Sharp Kabushiki Kaisha, Osaka-shi, Osaka (JP)

(72) Inventor: Kaori Ikuta, Osaka (JP)

(73) Assignee: Sharp Kabushiki Kaisha, Sakai (JP)

(*) Notice: Subject to any disclaimer, the term of this patent is extended or adjusted under 35 U.S.C. 154(b) by 114 days.

(21) Appl. No.: 14/413,437

(22) PCT Filed: Jul. 26, 2013

(86) PCT No.: PCT/JP2013/070301
§ 371 (c)(1),
(2) Date: Jan. 8, 2015

(87) PCT Pub. No.: WO2014/021209
PCT Pub. Date: Feb. 6, 2014

(65) Prior Publication Data
US 2015/0124177 A1    May 7, 2015

(30) Foreign Application Priority Data
Jul. 30, 2012   (JP) ................................ 2012-168216

(51) Int. Cl.
| F21V 8/00 | (2006.01) |
| G02F 1/1333 | (2006.01) |
| G02F 1/1335 | (2006.01) |
| H04N 5/74 | (2006.01) |
| H04N 9/31 | (2006.01) |

(52) U.S. Cl.
CPC ......... *G02B 6/0085* (2013.01); *G02B 6/0088* (2013.01); *G02B 6/0091* (2013.01);
(Continued)

(58) Field of Classification Search
CPC .. G02B 6/0085; G02B 6/0088; G02B 6/0091; G02F 1/133308; G02F 1/1336;
(Continued)

(56) References Cited

U.S. PATENT DOCUMENTS

| 8,958,022 B2 * | 2/2015 | Youk .................... G02B 6/0083 349/161 |
| 2007/0153548 A1 | 7/2007 | Hamada et al. |

(Continued)

FOREIGN PATENT DOCUMENTS

| CN | 101589267 A | 11/2009 |
| CN | 102346332 A | 2/2012 |

(Continued)

OTHER PUBLICATIONS

Official Communication issued in International Patent Application No. PCT/JP2013/070301, mailed on Sep. 3, 2013.

*Primary Examiner* — Peggy Neils
(74) *Attorney, Agent, or Firm* — Keating & Bennett, LLP

(57) ABSTRACT

A backlight device (a lighting device) 12 includes LEDs (a light source) 17, a light guide plate 16, a chassis 14, LED boards 18, and heat dissipation members 19. The light guide plate 16 includes an end surface that is opposite the LEDs 17 and configured as a light entrance surface 16b through which light from the LEDs 17 enters. One of the plate surfaces of the light guide plate 16 is configured as a light exit surface 16a through which the light exits. The chassis 14 supports another plate surface 16c of the light guide plate 16 opposite from the light exit surface 16a. Each LED board 18 includes a bottom plate 18b that extends parallel to at least the other plate surface 16c of the light guide plate 16. Each heat dissipation member 19 extends parallel to a plate surface 18b1 of the bottom plate 18b and is in surface contact with the plate surface 18b1 of the bottom plate 18b.

10 Claims, 11 Drawing Sheets

(52) U.S. Cl.
CPC ...... *G02F 1/1336* (2013.01); *G02F 1/133308* (2013.01); *G02F 1/133615* (2013.01); *H04N 5/7408* (2013.01); *H04N 9/315* (2013.01); *H04N 9/3144* (2013.01); *G02F 2001/133314* (2013.01); *G02F 2001/133628* (2013.01)

(58) Field of Classification Search
CPC ... G02F 1/133615; G02F 2001/133314; G02F 2001/133628; H04N 5/7408; H04N 9/3144; H04N 9/315
See application file for complete search history.

(56) References Cited

U.S. PATENT DOCUMENTS

| | | | |
|---|---|---|---|
| 2008/0129927 | A1 | 6/2008 | Hamada et al. |
| 2010/0073959 | A1 | 3/2010 | Hamada |
| 2011/0116011 | A1* | 5/2011 | Isobe .................... F21V 19/04 349/62 |
| 2011/0292682 | A1 | 12/2011 | Yu et al. |
| 2012/0014135 | A1 | 1/2012 | Kim |
| 2012/0026424 | A1 | 2/2012 | Youk et al. |
| 2013/0094245 | A1 | 4/2013 | Kanda et al. |
| 2014/0003088 | A1 | 1/2014 | Yu et al. |
| 2014/0003089 | A1 | 1/2014 | Yu et al. |

FOREIGN PATENT DOCUMENTS

| | | |
|---|---|---|
| CN | 102374456 A | 3/2012 |
| JP | 2006-156324 A | 6/2006 |
| JP | 2008-171797 A | 7/2008 |
| JP | 2011-249330 A | 12/2011 |
| JP | 2012-014949 A | 1/2012 |
| JP | 2012-054108 A | 3/2012 |

* cited by examiner

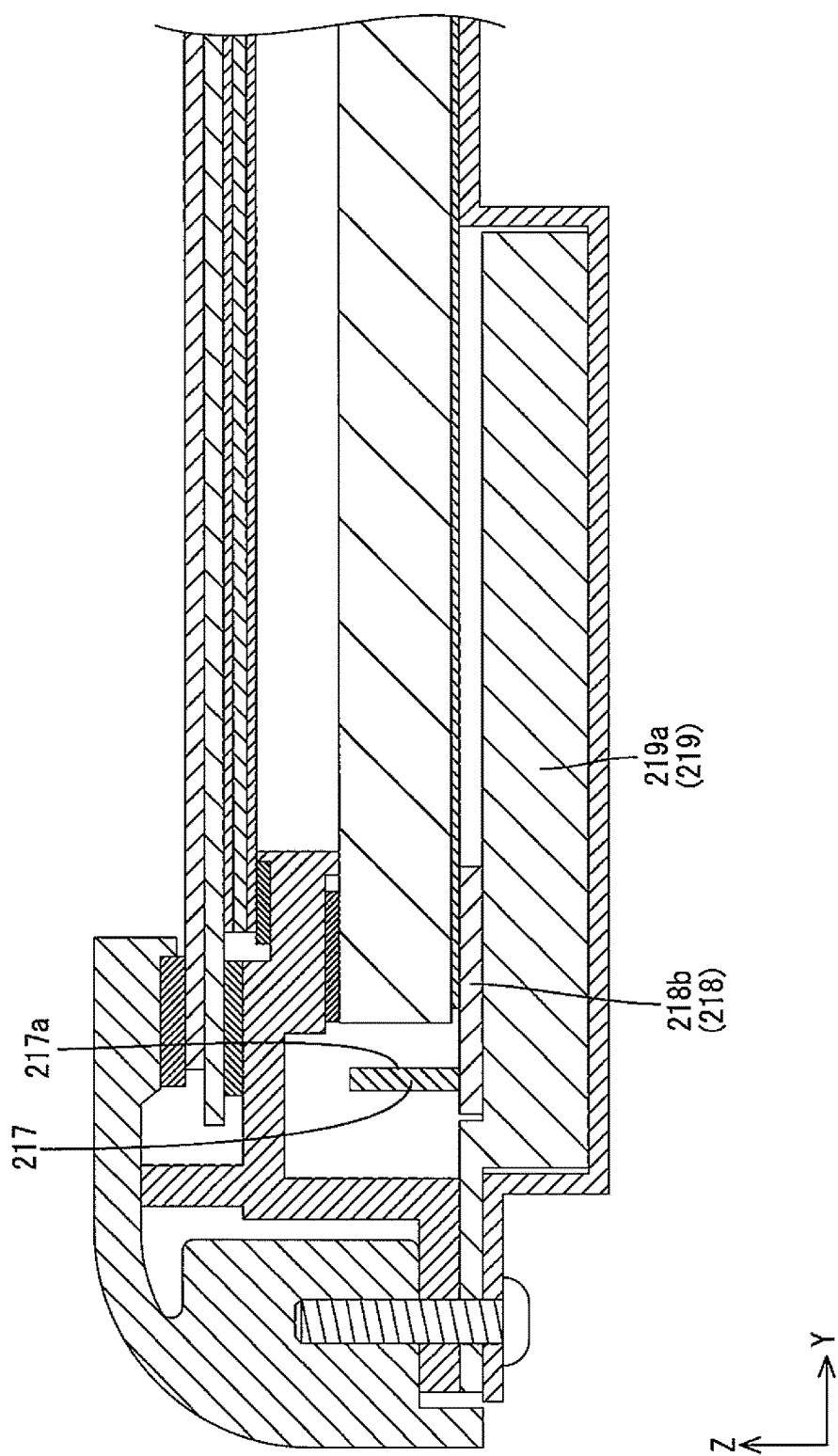

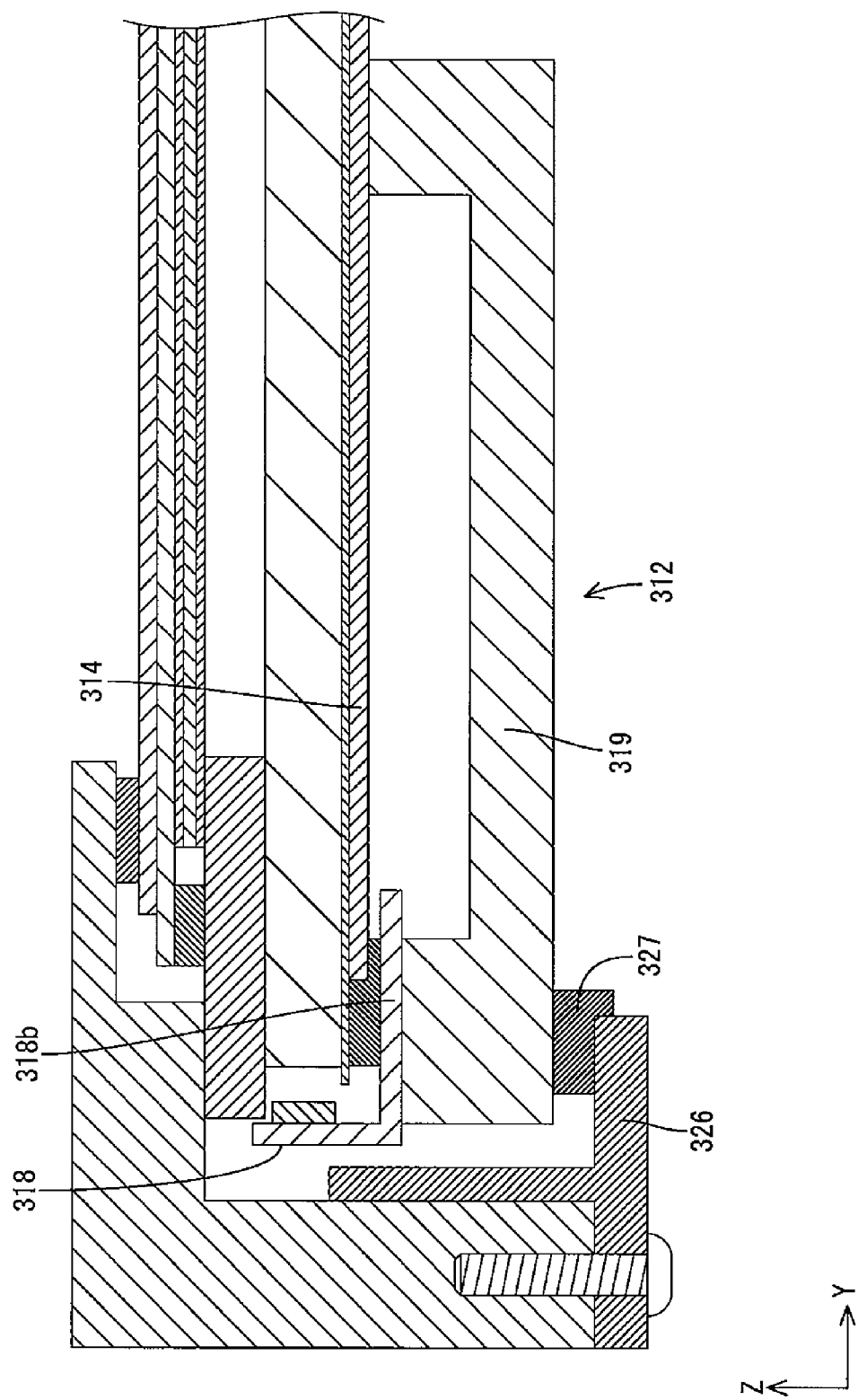

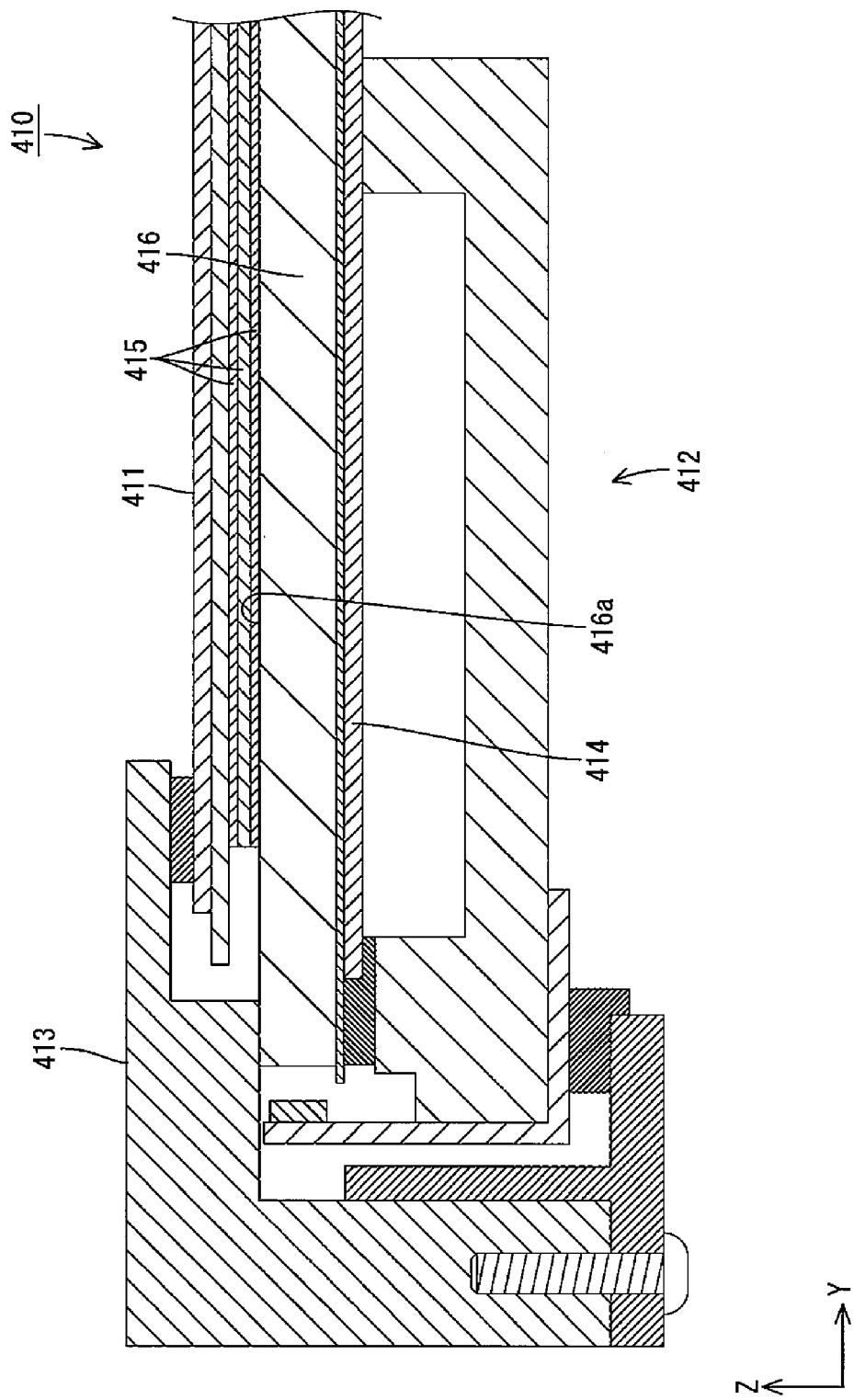

LIGHTING DEVICE, DISPLAY DEVICE AND TELEVISION DEVICE

TECHNICAL FIELD

The present invention relates to a lighting device, a display device, and a television device.

BACKGROUND ART

Displays in image display devices, such as television devices, are now being shifted from conventional cathode-ray tube displays to thin display panels, such as liquid crystal panels and plasma display panels. With the thin display panels, the thicknesses of the image display devices can be reduced. Liquid crystal panels included in liquid crystal display devices do not emit light, and thus backlight devices are required as separate lighting devices. The backlight devices are classified broadly into an edge-light type and a backlight type according to mechanisms. Edge-light type backlight devices are preferable for further reducing the thickness of liquid crystal display devices. An example of edge-light type backlight devices is disclosed in Patent Document 1.

In Patent Document 1, an LED board on which LEDs are mounted are arranged opposite an end surface of a light guide plate and the LED board is attached to a heat dissipation member. The LEDs are light sources. Heat from the LEDs is transmitted to the heat dissipation member via the LED board. This configuration is for promoting heat dissipation.

RELATED ART DOCUMENT

Patent Document

Patent Document 1: Japanese Unexamined Patent Application Publication No. 2012-14949

Problem to be Solved by the Invention

In such an edge-light type backlight device, light sources are concentrated on edge portions and thus heat tends to stay in the portions. As the number of light sources increases according to an increase in screen size of the liquid display device or an increase in intensity of display images, an amount of current supplied to the light sources increases. As a result, an amount of heat increases. Therefore, more proper heat dissipation measures may be required. An additional heat dissipation measure to the configuration disclosed in Patent Document 1 may include extended portions of the LED board and the heat dissipation member that are extended in the thickness direction of the light guide plate so that contact areas increase. However, with this configuration, the thickness of the backlight device increases. This is disadvantageous for decreasing the thickness of the backlight device.

DISCLOSURE OF THE PRESENT INVENTION

The technology described herein was made in view of circumstances. An object is to achieve high heat dissipation ability while a thickness of the lighting device is maintained small.

Means for Solving the Problem

A lighting device according to the present invention includes a light source, a light guide plate, a chassis, a light source mounting member, and a heat dissipation member. The light guide plate includes an end surface and a plate surface. The end surface is opposite the light source and configured as alight entrance surface through which light enters. The plate surface is configured as a light exit surface through which light exits. The chassis supports another plate surface of the light guide plate. The other plate surface is opposite from the light exit surface. The light source is mounted on the light source mounting member. The light source mounting member includes a bottom plate that extends parallel to at least the other plate surface of the light guide plate. The heat dissipation member extends parallel to a plate surface of the bottom plate and is in surface contact with the plate surface of the bottom plate.

According to this configuration, light from the light source is transmitted inside the light guide plate after entering the light guide plate through the light entrance surface. The light exits through the light exit surface. Heat is generated by the light source while it is turned on. The heat is transmitted to the light source mounting member and then to the heat dissipation member. As a result, the heat is dissipated. The heat dissipation member is provided separately from the chassis. In comparison to a configuration including a chassis that has the heat dissipating function, a material for the heat dissipation member is freely selected from materials having high heat dissipation capabilities. Furthermore, the shape or the arrangement of the heat dissipation member can be freely designed. Namely, a heat dissipation path can be more flexibly designed. Effects including the above can be achieved.

The light source mounting member includes the bottom plate that extends parallel to at least the other plate surface of the light guide plate. The heat dissipation member extends parallel to the plate surface of the bottom plate and is in surface contact with the plate surface of the bottom plate. In a conventional configuration in which plate surfaces of a light source mounting member and a heat dissipation member parallel to an end surface of a light guide plate contact each other, a contact area of the light source mounting member with the heat dissipation member is easily expandable. In the conventional configuration, there is a limit to expand the contact area between the light source mounting member and the heat dissipation member with limited space along the end surface of the light guide plate. When an expansion of the contact area is considered, an increase in dimension of the lighting device in the thickness direction of the light guide plate is required. According to the configuration in which the heat dissipation member extends parallel to the bottom plate of the light source mounting member, the contact areas between the light source mounting member and the heat dissipation member are expandable by increasing an extending dimension of the heat dissipation member and that of the bottom plate without increasing the dimension of the lighting device in the direction along the end surface of the light guide plate. Therefore, the heat is efficiently transmitted from the light source to the heat dissipation member via the light source mounting member while the thickness of the lighting device is maintained small. Namely, high heat dissipation efficiency can be achieved.

The following configurations of the lighting device according to the present invention are preferable.

(1) The heat dissipation member extends further than the bottom plate in an arrangement direction of the light source and the light guide plate. The heat dissipation member is arranged between the bottom plate and the chassis. According to this configuration, heat produced by the light source is transmitted to the bottom plate of the light source mounting member and then to the heat dissipation member. The heat dissipation member extends further than the bottom plate in the arrangement direction of the light source and the light guide plate. Therefore, the transmitted heat can be dissipated in a large area in the arrangement direction. The heat dissipation member is arranged between the bottom plate and the chassis. Therefore, the heat dissipation is enhanced by using the thermal capacity of the chassis and the higher heat dissipation capability is achieved.

(2) The light source mounting member is a light source board on which the light source is mounted and a trace for supplying power to the light source is formed. According to this configuration, the light source mounted on the light source board emits light when power is supplied through the trace. Because the light source board includes the bottom plate that is in surface contact with the heat dissipation member, heat produced by the light source while it is turned on can be efficiently dissipated.

(3) The light source board includes a light source mounting portion that projects from the bottom plate so as to oppose the light entrance surface of the light guide plate and on which the light source and the trace are arranged. In comparison to a configuration in which the light source and the trace are arranged on the bottom plate, this configuration is preferable for a light source that is relatively large and has a large light emitting area. Namely, this configuration is preferable for increasing the size of the lighting device.

(4) The bottom plate and the heat dissipation member overlap each other at least in part in a plan view. In comparison to a configuration in which the bottom plate and the heat dissipation member do not overlap each other in a plan view, this configuration is preferable for reducing the frame size of the lighting device.

(5) The chassis is arranged such that the bottom plate and the heat dissipation member are sandwiched between the chassis and the other plate surface of the light guide plate. According to this configuration, the bottom plate and the heat dissipation member are held within the chassis. If the bottom plate and the heat dissipation member are arranged outside the chassis, dust or foreign substances may enter into the chassis through a gap between the chassis and the bottom plate or the heat dissipation member. According to this configuration in which the bottom plate and the heat dissipation member are held inside the chassis, such a gap does not exist. Therefore, dust or foreign substances are less likely to enter into the chassis.

(6) The chassis includes a light guide plate supporting portion and a holding portion. The light guide plate supporting portion supports the other plate surface of the light guide plate. The holding portion protrudes from the light guide plate supporting portion in an opposite direction from the light guide plate and holds the bottom plate and the heat dissipation member. The heat dissipation member is arranged between the bottom plate and the holding portion. The plate surface of the heat dissipation member opposite from a plate surface on a bottom plate side is in surface contact with the holding portion. According to this configuration, the bottom plate and the heat dissipation member are held by the holding portion while the other plate surface of the light guide plate is supported by the light guide plate supporting portion of the chassis. The plate surface of the light guide plate opposite from the plate surface on the bottom plate side is in contact with the holding portion.

Therefore, heat transmitted from the bottom plate to the heat dissipation member is efficiently transmitted to the holding portion. Namely, the further higher heat dissipation capability is achieved.

(7) The bottom plate and the heat dissipation member are arranged such that the chassis is sandwiched between the other plate surface of the light guide plate and the bottom plate and the heat dissipation member. According to this configuration, the bottom plate and the heat dissipation member are arranged outside the chassis. Therefore, heat transmitted from the light source to the bottom plate and the heat dissipation member is efficiently dissipated to the outside of the chassis. Namely, the heat is less likely to stay inside the chassis and a higher heat dissipation capability is achieved.

(8) The bottom plate is arranged such that the heat dissipation member is sandwiched between the bottom plate and the chassis. The bottom plate to which heat from the light source is transmitted first is arranged on the opposite side of the heat dissipation member from the chassis. Therefore, the heat from the bottom plate is efficiently dissipated to the outside of the chassis.

(9) The heat dissipation member includes a chassis contact portion and a chassis non-contact portion. The chassis contact portion contacts a plate surface of the chassis opposite from the light guide plate. The chassis non-contact portion is opposite the plate surface of the chassis opposite from the light guide plate via an air layer. Because the heat dissipation member includes the chassis contact portion and the chassis non-contact portion, in comparison to a configuration that does not include the chassis non-contact portion, a contact area between the heat dissipation member and the chassis is small. Furthermore, because the air layer between the chassis non-contact portion and the chassis functions as a heat insulating layer, heat in the heat dissipation member is less likely to be transmitted to the light guide plate via the chassis. Therefore, the temperature of the light guide plate is less likely to increase and thus the light guide plate is less likely to thermally expand or thermally deform.

To solve the problem described earlier, a display device according to this invention includes the lighting device described above and a display panel configured to display an image using light from the light exit surface of the light guide plate included in the lighting device.

According to such a display device, because the lighting device configured to provide the display panel with light has the high heat dissipation capability while the thickness thereof is maintained small, the thickness of the display device is reduced and operation reliability is increased. Effects including the above can be achieved.

The following configurations of the lighting device according to the present invention are preferable.

(1) The display device further includes a frame-shaped member arranged on a display surface side of the display panel and holding the display panel such that the display panel is sandwiched between the frame-shaped member and the lighting device. The frame-shaped member forms an external appearance of the display device. The light source mounting member in the lighting device is arranged so as not to contact the frame-shaped member. With this configuration, heat produced by the light source is less likely to be transmitted from the light source mounting member to the frame-shaped member. The temperature of the frame-shaped member is less likely to increase due to the heat. The frame-shaped member is arranged on the display surface side of the display panel and forms the external appearance of the display device. Therefore, the frame-shaped member tends to contact external objects. Because the temperature of the frame-shaped member is less likely to increase, problems are less likely to occur even when the external objects contact the frame-shaped member.

The bottom plate and the heat dissipation member are arranged in the lighting device such that the chassis is sandwiched between the other plate surface of the light guide plate and the bottom plate and the heat dissipation member. The display device further comprises a fixing member that holds down the bottom plate and the heat dissipation member from an opposite side from the chassis and is fixed to the frame-shaped member. At least a portion of the fixing member in contact with the bottom plate or the heat dissipation member has thermal conductivity lower than those of the bottom plate and the heat dissipation member. In the lighting device, the bottom plate and the heat dissipation member are arranged outside the chassis. Therefore, heat transmitted from the light source to the bottom plate and the heat dissipation member is efficiently dissipated to the outside of the chassis. Namely, the heat is less likely to stay inside the chassis, that is, a higher heat dissipation capability is achieved. Furthermore, the fixing member that holds down the bottom plate and the heat dissipation member from the opposite side from the chassis and is fixed to the frame-shaped member has thermal conductivity lower than the bottom plate and the heat dissipation member at lease in the portion that is in contact with the bottom plate or the heat dissipation member. Therefore, heat is less likely to be transmitted from the bottom plate or the heat dissipation member to the frame-shaped member via the fixing member. With this configuration, the temperature of the frame-shaped member is further less likely to increase while the bottom plate and the heat dissipation member are properly held.

(3) An example of the display panel is a liquid crystal panel. Such a display device is applicable for a liquid crystal display device for a television set, a personal computer, or other purposes. The display device is especially preferable for a large-screen display device.

Advantageous Effect of the Invention

According to the present invention, the high heat dissipation capability is achieved while the thickness of the lighting device is maintained small.

BRIEF DESCRIPTION OF THE DRAWINGS

FIG. 9 is a cross-sectional view of a liquid crystal display device taken along a short-side direction thereof according to a third embodiment.

FIG. 10 is a cross-sectional view of a liquid crystal display device taken along a short-side direction thereof according to a fourth embodiment.

FIG. 11 is a cross-sectional view of a liquid crystal display device taken along a short-side direction thereof according to a fifth embodiment.

MODE FOR CARRYING OUT THE INVENTION

<First Embodiment>

A first embodiment will be described with reference to the FIGS. 1 through 6. A liquid crystal display device 10 according to this embodiment will be described. X-axis, Y-axis and Z-axis are indicated in some drawings. The axes in each drawing correspond to the respective axes in other drawings. The Y-axis direction corresponds to a vertical direction and the X-axis direction corresponds to a horizontal direction. An upper side and a lower side in FIG. 4 or 5 correspond to a front side and a rear side, respectively.

Figure 3:
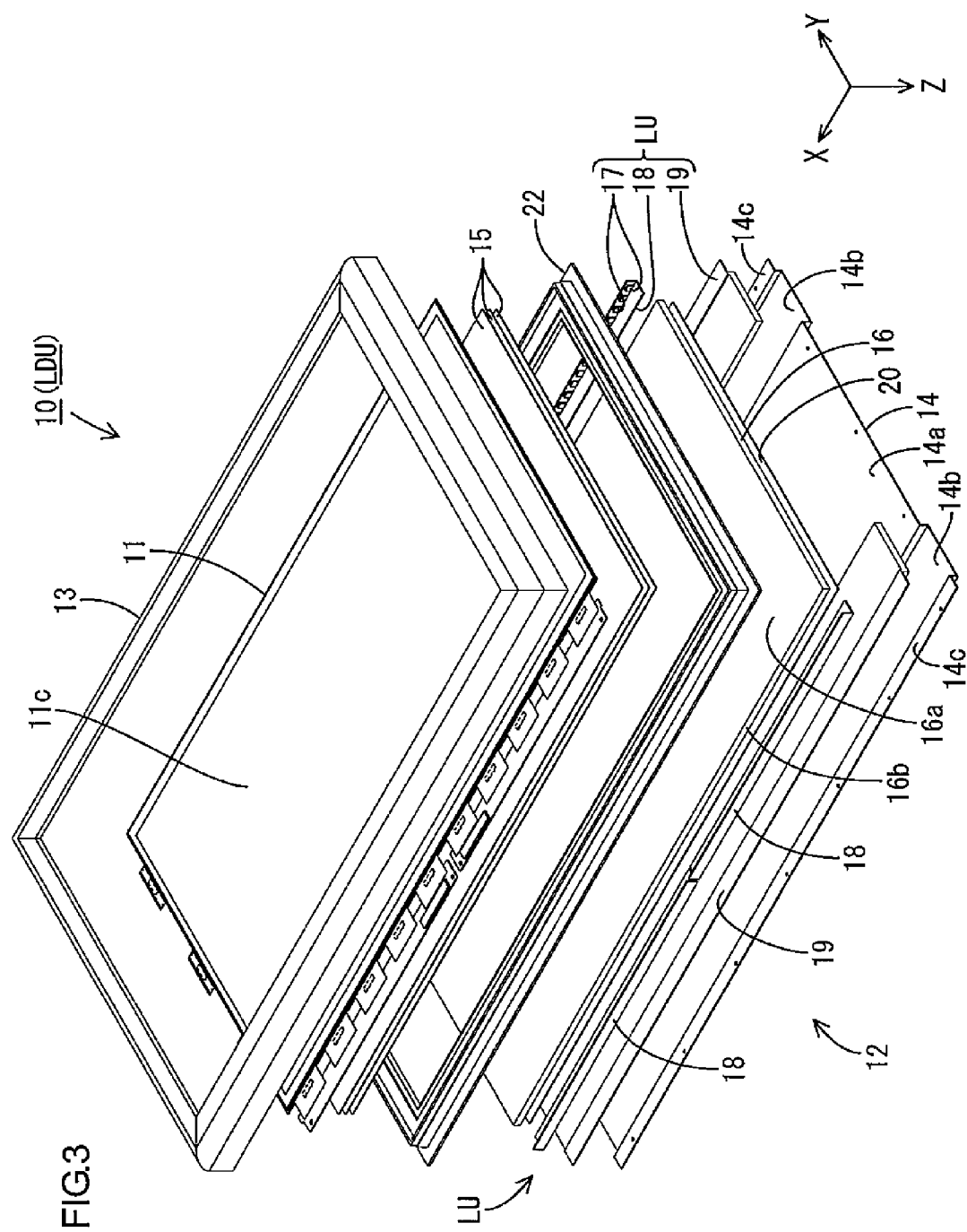
FIG. 3 is an exploded perspective view illustrating a general configuration of the liquid crystal display unit LDU of the liquid crystal display device.

A television device TV according to this embodiment includes a liquid crystal display unit (a display unit) LDU, boards PWB, MB, and CTB, a cover CV, and a stand ST. The boards PWB, MB, and CTB are attached to a rear surface (a back surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the Y-axis direction (the vertical direction). The liquid crystal display device 10 according to this embodiment has the same configuration as the above-described television device TV except for at least a component for receiving television signals (e.g. a tuner included in a main board MB). As illustrated in FIG. 3, the liquid crystal display unit LDU has a horizontally-long rectangular overall shape (rectangular and longitudinal). The liquid crystal display unit LDU includes a liquid crystal panel (a display panel) 11, a backlight device (a lighting device) 12, and an external frame (a frame-shaped member, an external frame-shaped member, a bezel) 13. The liquid crystal panel 11 includes a display surface for displaying images. The backlight device 12 is an external light source. The outer frame 13 is disposed more to the front (a display surface 11c side) than the display surface 11c of the liquid crystal panel 11. The outer frame 13 and the backlight device 12 hold the liquid crystal panel 11 therebetween. The frame 13 and a chassis 14 included in the backlight device 12 are external components that form an external appearance of the liquid crystal display device 10. The chassis 14 according to this embodiment is one of the components of the backlight device 12 although it is one of the external components.

Figure 1:
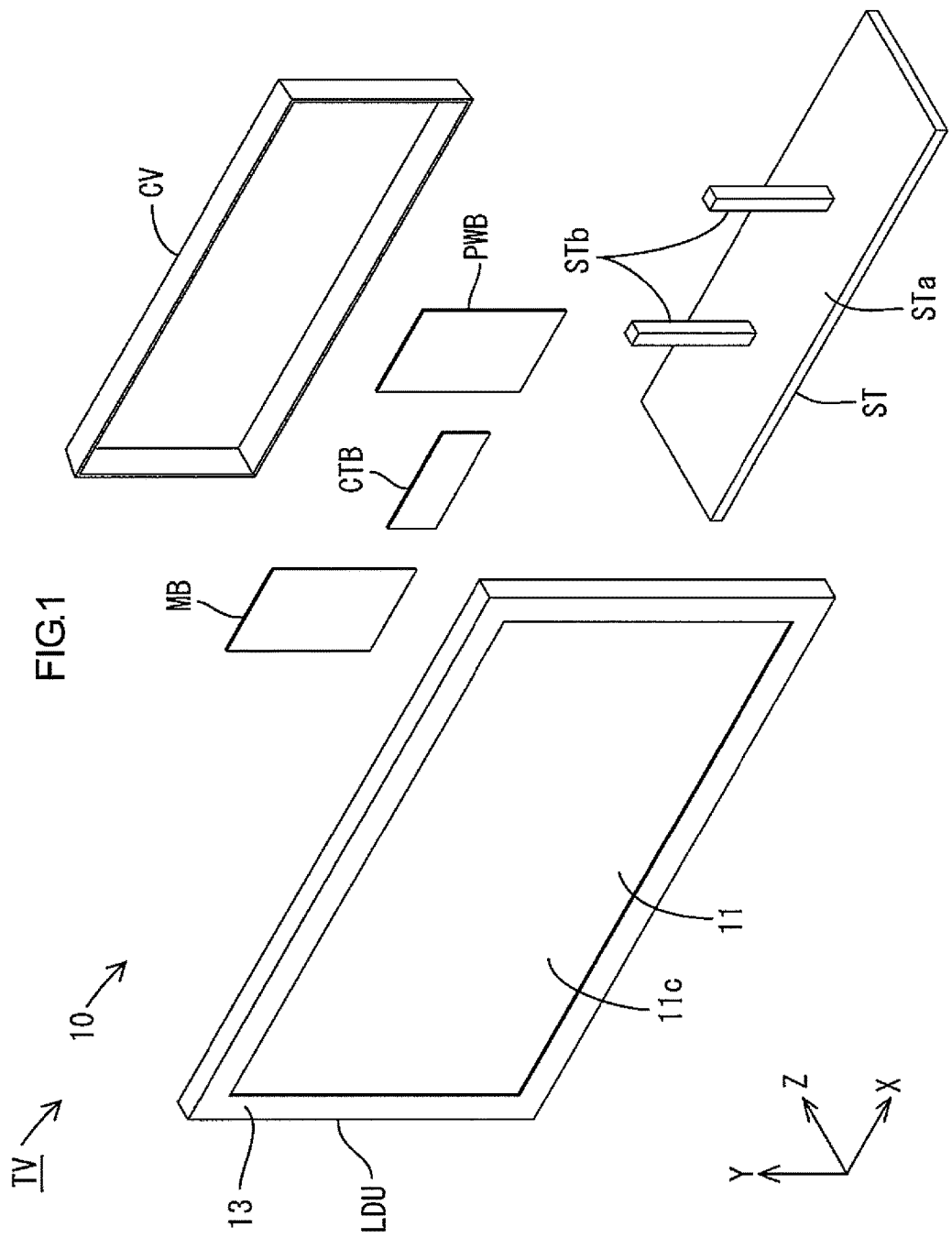
FIG. 1 is an exploded perspective view illustrating a general configuration of a television device and a liquid crystal display device according to a first embodiment of the present invention.
Figure 2:
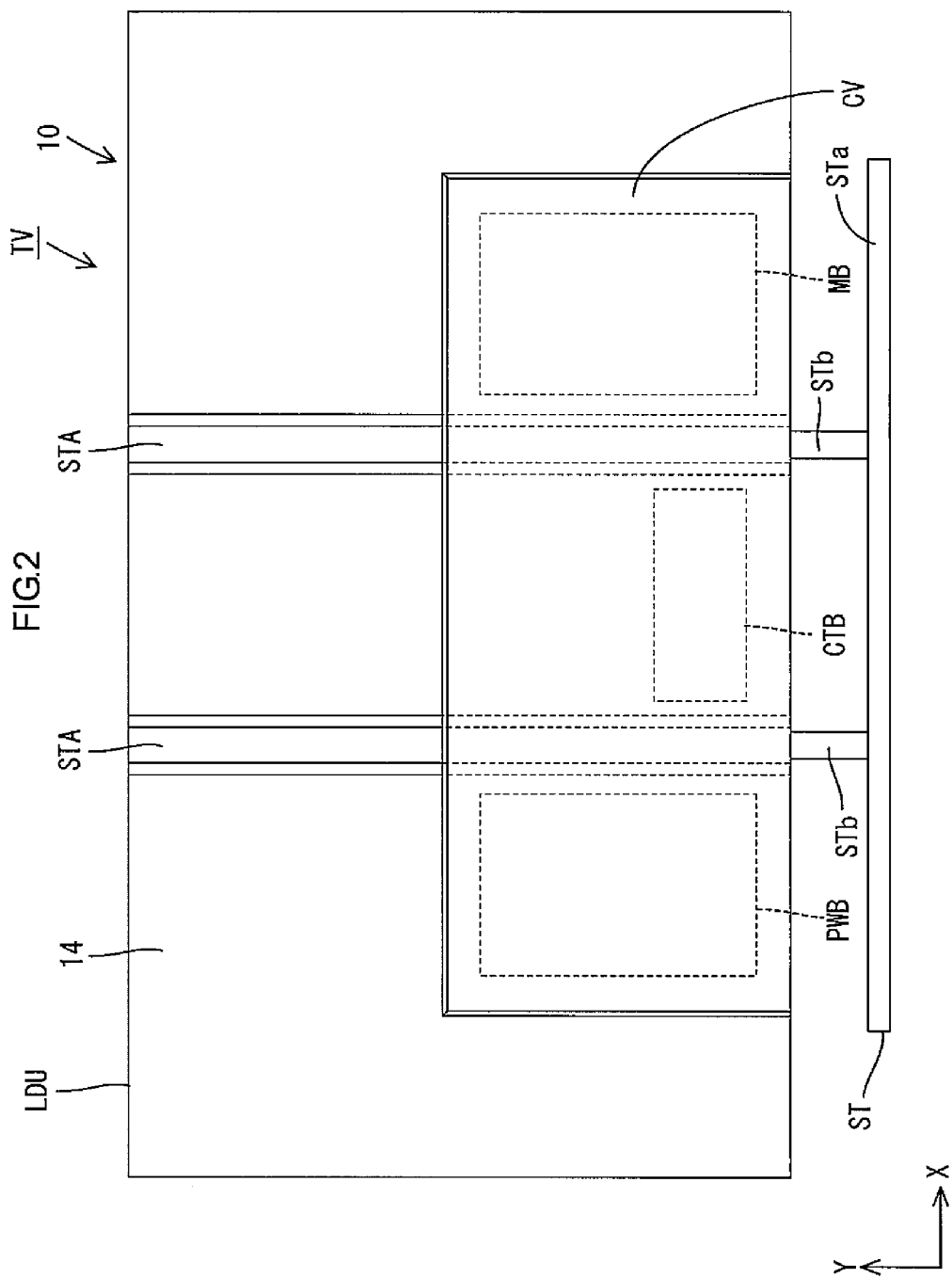
FIG. 2 is a rear view of the television device and the liquid crystal display device.

Configurations of the liquid crystal display device 10 on the rear surface side will be described. As illustrated in FIG. 2, stand fitting members STA are attached to a rear surface of the chassis 14 that forms a rear external appearance of the liquid crystal display device 10. The stand fitting members STA are spaced away from each other in an X-axis direction and extend along the Y-axis direction. Each stand fitting member STA has a cross section that corresponds to a cross section of a channel beam and opens to the chassis 14. A space is provided between the stand fitting member STA and the chassis 14. Support portions STb included in the stand ST are inserted in the respective stand fitting members STA. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are arranged therein.

As illustrated in FIG. 2, the liquid crystal display device 10 includes a power source board PWB, a main board MB, and a control board CTB as the boards PWB, MB, and CTB. The power source board PWB will be referred to as a power supply of the liquid crystal display device 10 and supplies drive power to the other boards MB and CTB and LEDs 17 included in the backlight device 12. Namely, the power source board PWB also serves as "an LED drive board (a light source drive board, a light source) which drives the LEDs 17." The main board MB includes at least a tuner and an image processor, which are not illustrated. The tuner is configured to receive television signals. The image processor performs image processing on the received television signals. The main board MB is configured to output the processed image signals to the control board CTB, which will be described next. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is transmitted from the main board, to driving signals for controlling liquid crystals and to supply the driving signals to the liquid crystal panel 11.

As illustrated in FIG. 3, components of the liquid crystal display unit LDU included in the liquid crystal display device 10 are arranged in a space between the frame 13 that provides a front external appearance and the chassis 14 that provides a rear external configuration. The components arranged between the frame 13 and the chassis 14 include at least the liquid crystal panel 11, an optical member 15, a light guide plate 16, an inner frame (an inner frame-shaped member) 22 and LED units (a light source unit) LU. The liquid crystal panel 11 and the optical member 15 are layered and held between the outer frame 13 on the front side and the inner frame 22 on the rear side. The backlight device 12 includes the light guide plate 16, the inner frame 22, the LED units LU, and the chassis 14. Namely, the configuration of the backlight device 12 corresponds to the liquid crystal display unit LDU without the liquid crystal panel 11, the optical member 15, and the outer frame 13. The LED units LU included in the backlight device 12 are arranged in the space between the inner frame 22 and the chassis 14. Two LED units LU are arranged such that the light guide plate 16 are sandwiched therebetween with respect to the short-side direction of the light guide plate 16 (the Y-axis direction, the vertical direction). The arrangement direction in which the LED units LU and the light guide plate 16 are arranged corresponds to the Y-axis direction. Each LED unit LU includes LEDs 17 as light sources, the LED board 18 (a light source board, a light source mounting member) on which the LEDs 17 are mounted, and the heat dissipation member 19 to which the LED board 18 is attached. Each component will be described next.

Figure 4:
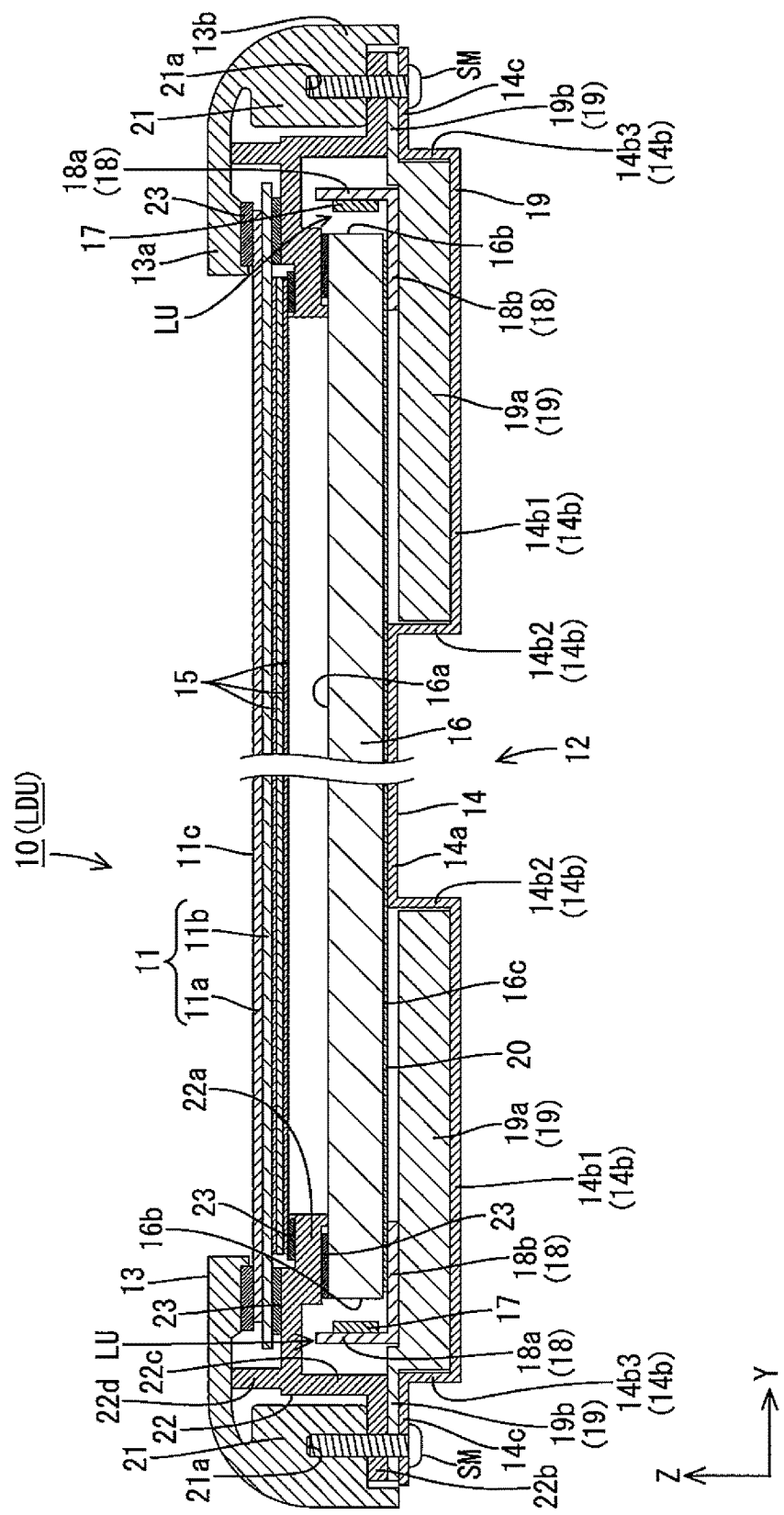
FIG. 4 is a cross-sectional view of the liquid crystal display device taken along a short-side direction thereof.

As illustrated in FIGS. 3 and 4, the liquid crystal panel 11 has a horizontally-long rectangular shape (rectangular and longitudinal) in a plan view and includes a pair of glass substrates 11a and 11b and liquid crystals. The substrates 11a and 11b having high light transmissivity are bonded together with a predetermined gap therebetween. The liquid crystals are sealed between the substrates 11a and 11b. One of the substrate 11a, 11b on the front side is a CF board 11a. The other one of the substrate 11a, 11b on the rear side (the back side) is an array board 11b. On the array board 11b, switching components (e.g. TFTs), pixel electrodes, and an alignment film are arranged. The switching components are connected to gate lines and source lines that are arranged perpendicular to each other. The pixel electrodes are connected to the switching components. On the CF board 11a, color filters, a counter electrode, and an alignment film are arranged. The color filters include red (R), green (G), and blue (B) color portions that are arranged in a predetermined arrangement. Polarizing plates (not illustrated) are disposed on outer surfaces of the boards 11a, 11b, respectively.

Among the boards 11a, 11b of the liquid crystal panel 11, as illustrated in FIG. 4, the array board 11b has a plan-view size larger than the CF board 11a. Edge portions of the array board 11b project over the CF board 11a. Specifically, the array board 11b is slightly larger than the CF board 11a such that the outer edges of the array board 11b are located outer than the outer edges of the CF board 11a for the entire periphery of the array board 11b. Terminals are disposed at one of the edge portions of the array board 11b on a long edge. The gate lines and the source lines are routed from the terminals. Flexible circuit boards on which drivers for driving liquid crystals are mounted are connected to the terminals. Signals are transmitted from the control board CTB to the terminals via the flexible circuit boards. According to the signals, images are displayed on the display surface 11c of the liquid crystal panel 11.

As illustrated in FIG. 4, the liquid crystal panel 11 is placed on the front surface of the optical member 15 (on the light exiting side), which will be described next. The back surface of the liquid crystal panel 11 is attached to the optical member 15 with little gap. With this configuration, dust or other substances are less likely to enter between the liquid crystal panel 11 and the optical member 15. The display surface 11c of the liquid crystal panel 11 includes a display area and a non-display area. The display area corresponding to a central region of the screen is configured to display images. The non-display area corresponds to a frame-shaped outer area of the screen around the display area. The liquid crystal panel 11 has a plan-view size (the short dimension by the long dimension) is slightly larger than the optical member 15, which will be described next. Outer edge portions of the liquid crystal panel 11 project over the optical member 15.

As illustrated in FIG. 3, similar to the liquid crystal panel 11, the optical member 15 has a horizontally-long rectangular shape in a plan view and has a plan-view size (a short dimension by a long dimension) slightly smaller than the liquid crystal panel 11. The optical member 15 is placed on a front surface of the transparent plate 30, which will be described later, and sandwiched between the transparent plate 30 and the liquid crystal panel 11. The optical member 15 includes three sheets that are placed on top of one another. Specifically, a diffuser sheet 15a, a lens sheet (a prism sheet) 15b, and a reflecting type polarizing sheet 15c are placed on top of one another in this sequence from the rear side (the light guide plate 16 side). Each of the three sheets 15a, 15b, and 15c has the substantially same size in a plan view.

Next, the outer frame 13 that are the external member and configured to hold down the liquid crystal panel from the front side will be described. The outer frame 13 is made of metal such as aluminum. In comparison to synthetic resin, mechanical strength (rigidity) and thermal conductivity are higher. As illustrated in FIGS. 3 and 4, the outer frame 13 is in a horizontally-long rectangular overall shape of frame so as to surround the display area of the display surface 11c of the liquid crystal panel 11. The outer frame 13 includes a panel-holddown portion 13a and a sidewall portion 13b. The panel-holddown portion 13a is parallel to the display surface 11c of the liquid crystal panel 11 and configured to hold down the liquid crystal panel 11 from the front side. The sidewall portion 13b projects from an outer edge portion of the panel-holddown portion 13a toward the rear side. The outer frame 13 has an L-like cross section. The panel-holddown portion 13a is in a horizontally-long rectangular shape of frame along the outer edge portion of the liquid crystal panel 11 (the non-display area, the frame portion). The panel-holddown portion 13a is configured to hold down the outer edge portion of the liquid crystal panel 11 for the entire length. A cushion 23 is disposed between the panel holddown portion 13a and the liquid crystal panel 11. An outer surface of the panel holddown portion 13a facing the front side (an opposite surface from a surface that faces the liquid crystal panel 11) is exposed and viewed from the front side of the liquid crystal display device 10 as the display surface 11c of the liquid crystal panel 11. The surface of the holding portion 13a and the display surface 11c of the liquid crystal panel 11 from the front appearance of the liquid crystal display device 10. The sidewall portion 13b is in a rectangular tube-like shape that project from the outer edge portion of the panel-holddown portion 13a toward the rear side. The sidewall portion 13b surrounds an entire periphery of the backlight unit 12 (the inner frame 22, the heat dissipation member 19, and the chassis 14). Outer surfaces of the sidewall portion 13b along the periphery of the liquid crystal display device 10 is exposed and viewed from the sides. The outer surfaces form the top, bottom, and side appearances of the liquid crystal display device 10.

As illustrated in FIG. 4, screw mounting portions (fixing member mounting portions) 21 are integrally formed with inner surfaces of the sidewall portion 13b. Screws (fixing members) SM are mounted to the respective screw mounting portions from the rear side. Each screw mounting portion 21 has a block-like shape and projects inward (toward the inner frame 22) from the inner surface of the sidewall portion 13b. The screw mounting portions are arranged away from each other along edges of the sidewall portion 13b in directions in which the edges extend, respectively. The screw mounting portions 21 are configured such that the inner frame 22 and the heat dissipation member 19 are sandwiched between the chassis 14 and the screw mounting portions 21 and held with the screws SM that are mounted from the rear side. Each screw mounting portion 21 has a mounting hole 21a that opens to the rear side. The mounting hole 21a is for tightening the screw.

Next, components of the backlight unit 12 will be described. The light guide plate 16 is made of transparent (i.e., having high light transmissivity) synthetic resin (e.g., acrylic resin such as PMMA, polycarbonate) having a refractive index sufficiently higher than that of air. As illustrated in FIG. 3, the light guide plate 16 has a horizontally-long rectangular plan-view shape similar to the liquid crystal panel 11 or the optical member 15. A long-side direction and a short-side direction of a plate surface of the light guide plate 16 correspond to the X-axis direction and the Y-axis direction, respectively. A thickness direction of the plate surface corresponds to the Z-axis direction (a direction in which the light guide plate 16 is placed on the liquid crystal panel 11). A ratio between a short dimension and a long dimension of the light guide plate 16 is about 9:16. The light guide plate 16 is arranged behind the optical member 15 with a predetermined distance away from the optical member 15 so as to oppose the optical member 15. The light guide plate 16 is sandwiched between the LED units LU in the Y-axis direction. The LED units LU are arranged away from each other in the short-side direction of the light guide plate 16 (in the Y-axis direction). Rays of light from the LEDs 17 enter the light guide plate 16 from ends of the short dimension of the light guide plate 16. The light guide plate 16 is configured to guide the light from the rays of light from the LEDs 17 that enter from the ends travel inside the light guide plate 16 and exit toward the optical member 15 (to the front side).

As illustrated in FIG. 4, the plate surface that faces the front side (the opposed surface to the optical member 15) of the light guide plate 16 is configured as a light exit surface 16a. The rays of light in the light guide plate 16 are exit from the light exit surface 16a toward the optical member 15 and the liquid crystal panel 11. Among the side surfaces of the light guide plate 16 adjacent to the plate surface thereof, the long side surfaces that are elongated in the X-axis direction (or end surfaces at the ends of the short dimension) are arranged opposite the LEDs 17 (the respective LED boards 18) with a predetermined gap. The long side surfaces are configured as light entrance surfaces 16b through which the rays of light emitted by the LEDs 17. The light entrance surfaces 16b are parallel to the X-Z plane (the plate surfaces of the LED boards 18) and substantially perpendicular to the light exit surface 16a. The arrangement direction of the LEDs 17 and each light entrance surface 16b corresponds to the Y-axis direction and perpendicular to the light exit surface 16a. The light entrance surfaces 16b are opposed to the LEDs 17, that is, the light entrance surfaces 16b are "end surfaces opposite the LEDs (end surfaces opposite light sources)." Among the side surfaces of the light guide plate 16 adjacent to the plate surface thereof, the short side surfaces that are elongated in the Y-axis direction are end surfaces that are not opposite the LEDs (end surfaces that are not opposite light sources).

As illustrated in FIG. 4, light guide and reflection sheet (a reflector) 20 is disposed on a rear plate surface of the light guide plate 16 on the rear side, that is, opposite from the light exit surface 16a (i.e., an opposed surface to the chassis 14). The light guide and reflection sheet 20 covers about an entire area of the plate surface. The light guide and reflection sheet 20 is configured to reflect rays of light exit from the rear plate surface 16c to the rear side toward the front side. The light guide and reflection sheet 20 is arranged between the chassis 14 and the light guide plate 16, that is, sandwiched therebetween. The light guide and reflection sheet 20 is made of synthetic resin. Surfaces of the light guide and reflection sheet 20 are in white that provides high light reflectivity. At least one of the light exit surface 16a and the plate surface opposite therefrom of the light guide plate 16 includes a light reflecting portion (not illustrated) or a light scattering portion (not illustrated). The light reflecting portion is for reflecting the rays of light inside the light guide plate 16. The light scattering portion is for scattering the rays of light inside the light guide plate 16. The light reflecting portion or the light scattering portion are formed by patterning with a predetermined in-plane distribution so that exiting rays of light from the light exit surface 16*a* exhibit a uniform in-plane distribution.

As illustrated in FIGS. 3 and 4, the inner frame 22 is in a horizontally-long rectangular overall shape of frame similar to the outer frame 13. The inner frame 22 is made of synthetic resin. Surfaces of the inner frame 22 are in black, that is, have light blocking properties. The inner frame 22 includes inner frame portions 22*a*, outer frame portions 22*b*, connecting portions 22*c*, and outer frame supporting portions 22*d*. The inner frame portions 22*a* are arranged between the light guide plate 16 and the optical plate 15 and the liquid crystal panel 11. The outer frame portions 22*b* are arranged between the outer frame 13 and the chassis 14. The connecting portions 22*b* connect the inner frame portions 22*a* to the outer frame portions 22*b*. The outer frame supporting portions 22*d* support the outer frame 13 from the rear side. The inner frame portions 22*a* hold down the outer edge portion of the light guide plate 16 from the front side for about an entire length. The inner frame portions 22*a* receive the outer edge portions of the liquid crystal panel 11 and the optical member 15 from the rear side for about entire lengths. Outer portions of the inner frame portions 22*a* are configured to receive the outer edge portions of the liquid crystal panel 11. Inner portions of the inner frame portions 22*a* are configured to receive the outer edge portions of the optical member 15. The outer portions project from the inner edge portions to the front side in a step-like form. Cushions 23 are disposed between the light guide plate 16 and the inner frame portions 22, between the optical member 15 and the inner frame portions 22*a*, and between light guide plate 16 and the inner frame portions 22*b*. The outer frame portions 22*b* are arranged more to the rear side than the inner frame portions 22*a*. The outer frame portions 22*b* are sandwiched between the outer edge portion of the chassis 14 and the screw mounting portions 21 of the outer frame 13 and screwed. The connecting portions 22*c* connect the inner edges of the outer frame portions 22*b* on the rear side to the outer edges of the inner frame portions 22*a* on the front side. The connecting portions 22*c* extend in the Z-axis direction from the inner edges to the outer edges. The outer frame support portions 22*d* are in contact with the back surface of the outer frame 13 and mechanically support the outer frame 13 for reinforcement purposes.

Next, configurations of the LEDs 17, the LED boards 18, and the heat dissipation members 19 included in the LED units LU will be described one by one. Each LED 17 includes a board fixed to the corresponding LED board 18, as illustrated in FIGS. 3 and 4, and an LED chip disposed on the board and sealed with a resin. Each LED mounted on the board is configured to emit light with a single main emitting wavelength, specifically, in a single color of blue. The resin that seals the LED chip contains phosphors that emit specific color of light, substantially white light, when excited by the blue light from the LED chip. The phosphors are scattered in the resin. The phosphors may be selected from yellow phosphors that emits yellow light, green phosphors that emits green light, and red phosphors that emits red light or a combination of those as appropriate. A surface of the LED 17 opposite from a mounting surface thereof that is mounted to the LED board 18 (a surface opposite the light entrance surface 16*b* of the light guide plate 16) is a main light emitting surface 17*a*. Namely, the LED 17 is a so-called top light emitting type. The main light emitting surface 17*a* of the LED 17 has a substantially rectangular shape that extends in the horizontal direction (elongated in the X-axis direction) when viewed from the front.

Each LED board 18 includes a base member made of metal having high thermal conductivity such as aluminum. As illustrated in FIGS. 3 and 4, the LED board 18 extends in the long-side direction of the light guide plate 16 (the X-axis direction, the longitudinal direction of the light entrance surface 16*b*). The length of the LED board 18 is about a half of the long dimension of the light guide plate 16. Two LED boards 18 are arranged in the longitudinal direction thereof and attached to the light dissipation member 19, which will be described later. Each LED board 18 has a bent with a substantially L-shaped cross section. The LED board 18 includes an LED mounting portion (a light source mounting portion) 18*a* and a bottom plate 18*b*. The LED mounting portion 18*a* is opposite the light entrance surface 16*b* of the light guide plate 16. The LEDs 17 are mounted to the LED mounting portion 18*a*. The bottom plate 18*b* extends parallel to the rear plate surface 16*c* of the light guide plate 16 (on the side opposite from the light exit surface 16*a*).

Figure 5:
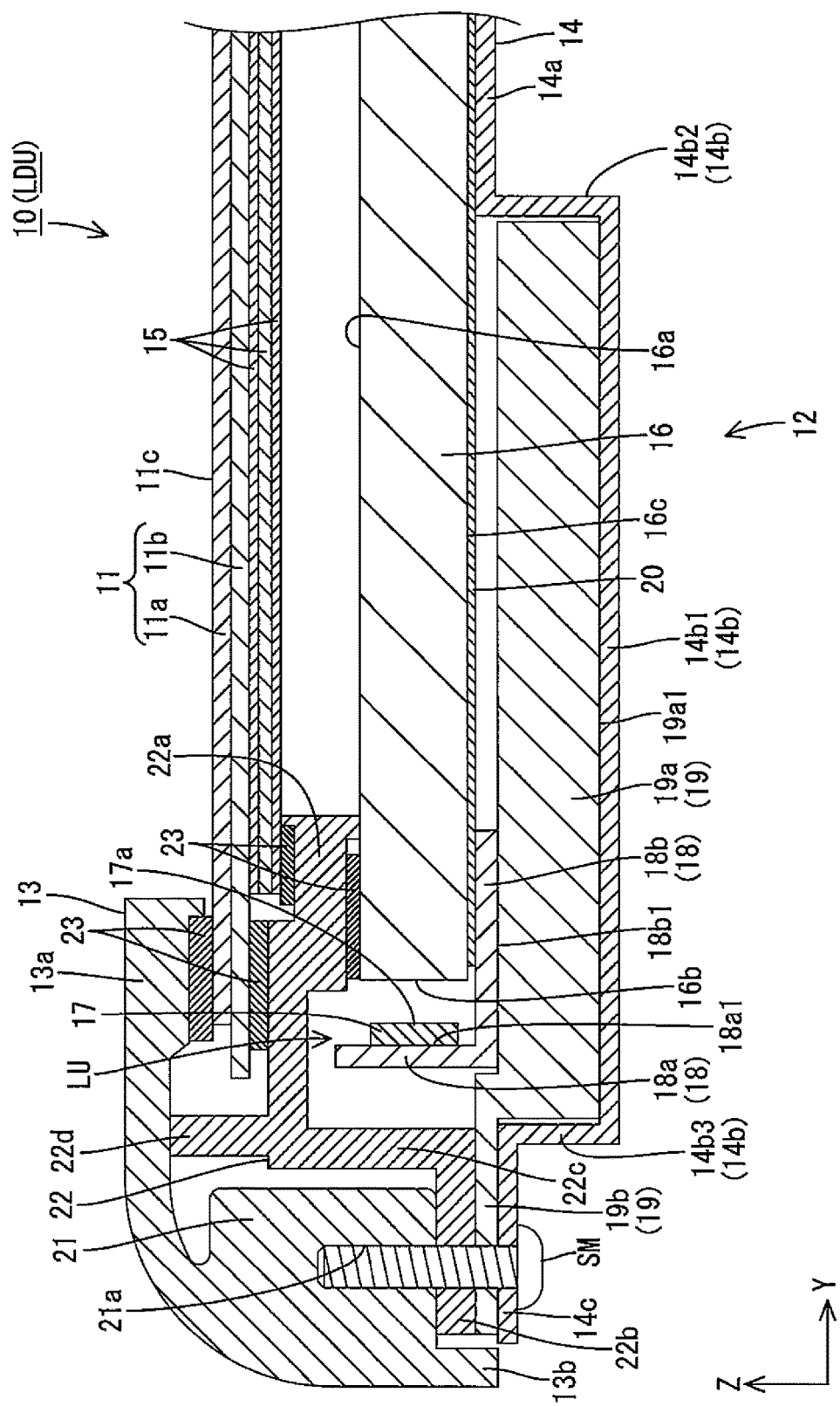
FIG. 5 is a magnified view of FIG. 4.

As illustrated in FIG. 5, the LED mounting portion 18*a* is arranged a predetermined distance away from the light entrance surface 16*b* such that the plate surface thereof is parallel to the X-Y plane, that is, to the light entrance surface 16*b* of the light guide plate 16. The LED mounting portion 18*a* has a plate-like shape orientated with a long-side direction, a short-side direction, and a thickness direction corresponding to the X-axis direction, the Z-axis direction, and the Y-axis direction, respectively. The LED mounting portion 18*a* extends from an outer edge of the bottom plate 18*b*, which will be described next, in the Z-axis direction toward the front side. The LEDs 17 are surface mounted on an inner plate surface of the LED mounting portion 18*a*, that is, the plate surface that faces the light guide plate 16. The inner plate surface is a mounting surface 18*a*1. The LEDs 17 are arranged parallel to each other on the mounting surface 18*a*1 of the LED mounting portion 18*a* in line (or linearly) at predetermined intervals along the longitudinal direction thereof (the X-axis direction). Namely, multiple LEDs 17 are arranged parallel to each other along the long edges of the backlight device 12 close to the long edges of the backlight device 12. Distances between the adjacent LEDs 17 in the X-axis direction are substantially equal, that is, the LEDs 17 are arranged at substantially equal intervals. The LED mounting portions 18*a* and the LEDs 17 mounted thereon are covered with the inner frame 22 from the front side and physically and optically isolated from the outer frame 13, the liquid crystal panel 11, and the optical member 15. Therefore, the LED mounting portions 18*a* are maintained in a condition that they are not in contact with the outer frame 13 and thus heat produced by the LEDs 17 are not directly transmitted to the outer frame 13 via the LED mounting portions 18*a*. Traces are formed on the mounting surfaces 18*aq* of the LED mounting portions 18*a* (not illustrated). The traces extend in the X-axis direction and cross the LEDs 17 to connect the adjacent LEDs 17 one another in series. The traces are metal films (copper foils). Terminals are provided at ends of the traces. Driving power is supplied to the LEDs 17 when the terminals are connected to an external LED driving circuit. The base members of the LED boards 18 are made of metal as described earlier and thus the traces are formed on the mounting surface 18*a*1 of each LED mounting portion 18*a* via an insulating layer. The arrangement direction of the LEDs 17 corresponds to the longitudinal direction of the LED board 18 (the X-axis direction). An optical axis of each LED 17 roughly corresponds to the Y-axis direction, that is, the arrangement direction of the light guide plate 16 and the LED 17.

As illustrated in FIG. 5, the bottom plate 18b is arranged such that the plate surface 18b1 thereof is parallel to the X-Y plane, that is, parallel to the rear plate surface 16c of the light guide plate 16. The bottom plate 18b is opposite the rear plate surface 16c via the light guide and reflection sheet 20. The bottom plate 18b includes a portion that overlaps the light guide plate 16 in a plan view. The light guide and reflection sheet 20 is sandwiched between the overlapping portion and the light guide plate 16. The bottom plate 18b has a plate-like shape with the long-side direction, the short-side direction, and the thickness direction corresponding to the X-axis direction, the Y-axis direction, and the Z-axis direction, respectively. The bottom plate 18b extends from the edge of the LED mounting portion 18a on the rear side toward the middle of the light guide plate 16 along the Y-axis direction. A portion of the bottom plate 18b located inner than the light entrance surface 16b with respect to the Y-axis direction is the overlapping portion that overlaps the light guide plate 16.

As illustrated in FIGS. 3 and 4, the heat dissipation member 19 is made of metal having high heat conductivity such as aluminum. The heat dissipation member 19 extends along the long-side direction of the light guide plate 16. A length of the heat dissipation member 19 is about equal to the long dimension of the light guide plate 16. Two LED boards 18 are arranged along the longitudinal direction of the heat dissipation member 19 and attached to the heat dissipation member 19. As illustrated in FIG. 5, the heat dissipation member 19 is arranged such that the plate surface thereof is parallel to the X-Y plane, that is, parallel to the plate surface 18b1 of the bottom plate 18b of the LED board 18 on the rear side and the rear plate surface 16c of the light guide plate 16. The heat dissipation member 19 is in surface contact with the plate surface 18b1 of the bottom plate 18b. An entire area of the plate surface 18b1 of the bottom plate 18b is in surface contact with the heat dissipation member 19. With this configuration, heat generated while the LEDs 17 are turned on is first transmitted to the LED board 18. The heat is second transmitted to the heat dissipation member 19 with which the bottom plate 18b is in surface contact, and third transmitted from the heat dissipation member 19 to the chassis 14. The heat dissipation member 19 is in surface contact with the plate surface 18b1 of the bottom plate 18b of the LED board 18 on the rear side and parallel to the rear plate surface 16c of the light guide plate 16. In comparison to a conventional configuration in which a plate surface of an LED board and that of a heat dissipation member parallel to a light entrance surface of a light guide plate are in contact with each other, a contact area of the LED board 18 with the heat dissipation member 19 is easily expandable. In a space along the light entrance surface of the light guide plate in the above conventional configuration, an expansion of the contact area may be considered. To further expand the contact area after the LED board and the heat dissipation member are fully increased in dimension along the longitudinal direction of the light entrance surface, expansion of the LED board and the heat dissipation member in the thickness direction of the light guide plate is required. This causes an increase in thickness of the backlight device. In this embodiment, the heat dissipation member 19 extends parallel to the bottom plate 18b of the LED board 18. Therefore, the contact area between the bottom plate 18b and the heat dissipation member 19 can be increased without increasing the backlight device 12 by extending the bottom plate 18b of the LED board 18 and the heat dissipation member 19 in the arrangement direction of the LEDs 17 and the light guide plate 16 (the Y-axis direction). With this configuration, heat from the LEDs 17 is efficiently transmitted to the heat dissipation member 19 via the LED board 18, that is, this configuration improves heat dissipation. As a result, high heat dissipation capability is achieved while the thickness of the backlight device 12 is maintained small.

As illustrated in FIG. 5, each heat dissipation member 19 includes a main heat dissipation portion 19a and a mounting portion 19b. The main heat dissipation portion 19a has a relatively large thickness. The mounting portion 19b has a relatively small thickness. The corresponding LED boards 18 are attached to the main heat dissipation portion 19a such that the plate surfaces 18b1 of the bottom plates 18b on the rear side are in surface contact with the main heat dissipation portion 19a. The main heat dissipation portion 19a is larger than the mounting portion 19b not only in thickness but also in dimension that measures in the Y-axis direction. The main heat dissipation portion 19a forms a large proportion of a volume (or a weight) of the heat dissipation member 19. The thickness of the main heat dissipation portion 19a is larger than those of the LED mounting portion 18a and the bottom plate 18b of the LED board 18. Namely, the main heat dissipation portion 19a has a large thermal capacity and mainly performs a function for releasing heat transmitted from the LED board 18. The mounting portion 19b projects more to the front than the main heat dissipation portion 19a so as to have a step-like form. The mounting portion 19b extends outward from an edge of the main heat dissipation portion 19a outer than the LED board 18 in the Y-axis direction. A distal end of the mounting portion 19b is sandwiched between the outer frame portion 22b of the inner frame 22 and the chassis 14 and fixed.

As illustrated in FIG. 5, the main heat dissipation portion 19a has a plate-like shape with a long-side direction, a short-side direction, and a thickness direction thereof correspond to the X-axis direction, the Y-axis direction, and the Z-axis direction, respectively. The main heat dissipation portion 19a extends in a larger area than the bottom plate 18b in the Y-axis direction, that is, the direction in which the LEDs 17 and the light guide plate 16 are arranged. Specifically, the main heat dissipation portion 19a has a dimension that measures in the Y-axis direction two to three times larger than that of the bottom plate 18b. The bottom plate 18b of the LED board 18 is attached to a portion of the main heat dissipation portion 19a adjacent to the outer edge that continues from the mounting portion 19b. Namely, the bottom plate 18b is attached to an outer portion of the main heat dissipation portion 19a with respect to the Y-axis direction with a fixing member such as a double sided tape and an adhesive. The portion of the main heat dissipation member 19a to which the bottom plate 18b is attached (a bottom plate attached portion) and the light guide plate 16 hold the bottom plate 18b of the LED board 18 and the light guide and reflection sheet 20 therebetween with respect to the Z-axis direction. Furthermore, the main heat dissipation portion 19a overlaps a portion of the bottom plate attached portion and a portion that extends inward from the bottom plate attached portion in the Y-axis direction (in an opposite direction to the light entrance surface 16b) when they are viewed from the top. With this configuration, frame sizes of the liquid crystal display device 10 and the backlight device 12 are reduced.

Next, the backlight device 12 and the chassis 14 that is one of the components that form the external appearance will be described. The chassis 14 is made of metal such as aluminum and thus has higher mechanical strength (rigidity)

and thermal conductivity in comparison to one that is made of synthetic resin. As illustrated in FIG. 3, the chassis 14 has a horizontally-long rectangular tray-like overall shape and covers about the light guide plate 16 and the LED units LU from the rear side for about an entire area. An outer surface that faces the rear side (an opposite surface from an opposed surface to the light guide plate 16 and the LED units LU) is exposed on the rear side of the liquid crystal display device 10, that is, a back surface of the liquid crystal display device 10.

As illustrated in FIGS. 3 and 4, the chassis 14 is arranged such that the bottom plates 18b of the LED boards 18 and the heat dissipation members 19 are sandwiched between the chassis 14 and the rear plate surface 16c of the light guide plate 16. Namely, the LED boards 18 and the heat dissipation members 19 are held inside the chassis 14. The chassis 14 includes a light guide plate supporting portion 14a, a pair of holding portions 14b, and mounting plate portions 14c. The light guide plate supporting portion 14a has a horizontally-long rectangular shape similar to the light guide plate 16. The holding portions 14b extend from the respective long edges of the light guide plate supporting portion 14a to the rear side in a form of step so as to hold the LED units LU, respectively. The mounting plate portions 14c extend outward from long edges of the respective holding portions 14b in the Y-axis direction. The light guide plate supporting portion 14a has a plate-like shape so as to support a large area of a middle portion of the rear plate surface of the light guide plate 16 from the rear side. Each holding portion 14b is recessed toward the rear side relative to the long edge of the light guide plate supporting portion 14a. With this configuration, each holding portion 14b can hold the bottom plates 18b of the LED boards 18 included in the LED unit LU and the heat dissipation member 19.

As illustrated in FIG. 5, each holding portion 14b includes a bottom portion 14b1 and a pair of side portions 14b2, 14b3. The bottom portion 14ba is parallel to the light guide plate supporting portion 14a. The side portions 14b2, 14b3 project from the respective edges of the bottom portion 14b1 to the front side. The inner side portion 14b2 of the pair of side portions 14b2, 14b3 continues from the light guide plate supporting portion 14a. The rear plate surface 19a1 of the main heat dissipation portion 19a of the heat dissipation member 19 is in surface contact with the bottom portion 14b1 for about an entire area of the bottom portion 14b1. With this configuration, heat transmitted from the LEDs 17 to the main heat dissipation portions 19a of the heat dissipation members 19 via the LED boards 18 are efficiently transmitted to the chassis 14 that is a metal member having a higher thermal capacity than the heat dissipation member 19. The configuration using the large thermal capacity of the chassis 14 improves the heat dissipation. The mounting plate portions 14c continue from the outer side portions 14b3 of the respective holding portions 14b. Each mounting plate portion 14c overlaps the screw mounting portion 21 of the outer frame 13, the outer frame portion 22 of the inner frame 22, and the mounting portion 19b of the heat dissipation member 19 in a plan view. The mounting portion 19b, the outer frame portion 22, and the chassis 14 have screw insertion holes that are through holes continue to the hole 21a of the screw mounting portion 21 of the frame 13. The screw SM is inserted to the screw insertion holes from the rear side of the mounting portion 19b and tightened in the hole 21a of the screw mounting portion 21.

Figure 6:
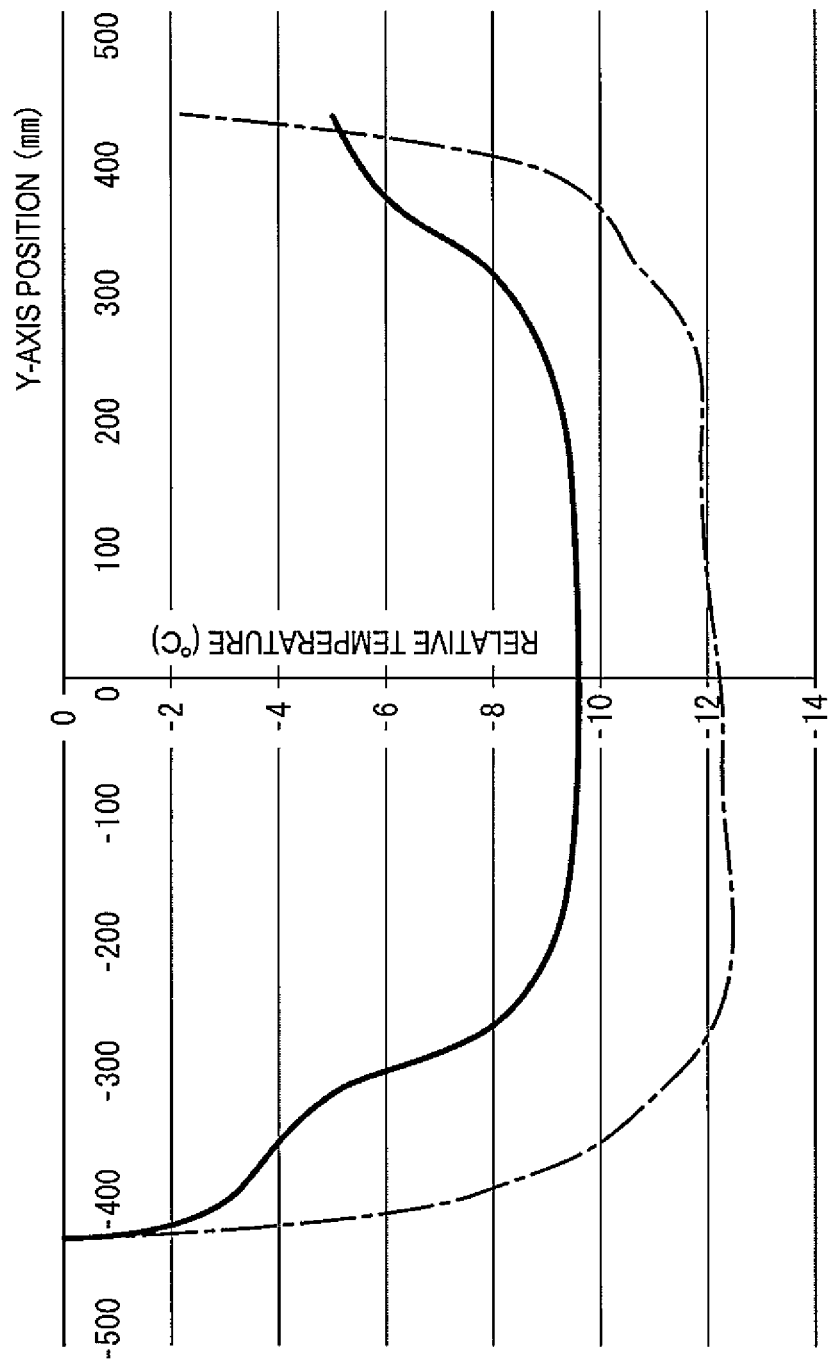
FIG. 6 is a graph illustrating relations between relative temperatures relative to a temperature at an end Y-axis position in the liquid crystal display device and Y-axis positions in the liquid crystal display device.

An experiment for comparison between the liquid crystal display device 10 according to this embodiment and a conventional liquid crystal display device will be described. In this experiment, the liquid crystal display device 10 according to this embodiment is referred to as a sample and the conventional liquid crystal display device is referred to as a comparative sample. The liquid crystal display devices were maintained in operation for predetermined time and temperatures on the display surfaces of the liquid crystal panels were measured. FIG. 6 illustrates how the temperatures change according to Y-axis positions. In FIG. 6, the horizontal axis represents positions on the liquid crystal display device relative to the Y axis (in unit of mm) and the vertical axis represents relative temperatures (in unit of ° C.). The horizontal axis in FIG. 6 represents relative values defied with a value at the center Y-axis position on the liquid crystal display device as a reference (0 mm). The vertical axis represents relative temperatures with the highest temperature measured at the Y-axis position of one end (the left end in FIG. 6) as a reference (0° C.). In FIG. 6, a curve regarding the sample is illustrated with a solid line and a curve regarding the comparative sample is illustrated with a one-dot chain line.

Configurations of the conventional liquid crystal display device according to the comparative sample will be described. An LED board having a plate-like shape and on which LEDs are mounted are arranged opposite a light entrance surface that corresponds to an end surface of a light guide plate included in a backlight device. A heat dissipation member having a plate-like shape similar to the LED board is arranged on an opposite side of the LED board from the light entrance surface. Plate surfaces of the LED board and the heat dissipation member parallel to the light entrance surface are in surface contact with each other. A plate surface of the heat dissipation member away from the LED board is in surface contact with a screw mounting portion of an outer frame and fixed thereto. The conventional liquid crystal display device according to the comparative sample includes substantially the same components and structures as those of the liquid crystal display device according to the sample except for the above configurations (the LED board and the heat dissipation member). Thicknesses of the liquid crystal display devices according to the sample and the comparative sample are substantially the same.

Results of the experiment will be described. As illustrated in FIG. 6, the curve regarding the comparative sample shows high temperature regions at end Y-axis positions in which the temperatures are relatively high. The curve shows a low temperature region at a middle Y-axis position in which the temperature is relatively low. A temperature difference between the high temperature regions and the low temperature region is slightly over 12° C. A difference between high temperature regions (at end Y-axis positions) and a low temperature region (at a middle Y-axis position) of the sample is slightly under 10° C. A temperature increase is further controlled in the sample than in the comparative sample. Namely, the sample has higher heat dissipation capability. Especially, temperature difference between the sample and the comparative sample around the end Y-axis positions (300 mm to 400 mm, −300 mm to −400 mm) is larger than that around the middle Y-axis position. At the end Y-axis positions in the liquid crystal display device, the LED units are arranged. Therefore, the temperature is most likely to increase. The temperature increases in those areas are effectively controlled in the sample.

Another experiment, other than the above comparative experiment, was performed. In the experiment, the liquid crystal display devices according to the sample and the comparative sample were maintained in operation for predetermined time and temperatures at the outer frames and areas of the LED boards near the LEDs (more specifically at soldering portions of lead terminals of the LEDs) were measured. Results of the experiment will be described. Regarding the temperatures at the outer frames, that of the sample was about 15.4° C. lower than that of the comparative sample. Regarding the temperatures at the areas of the LED boards near the LEDs, that of the sample was about 7.2° C. lower than that of the comparative sample. The liquid crystal display device according to the sample has the configuration in which the heat dissipation members 19 extend parallel to the bottom plates 18b of the LED boards 18. The bottom plates 18b of the LED boards 18 and the heat dissipation members 19 are expandable in the arrangement direction of the LEDs 17 and the light guide plate 16. Therefore, in comparison to the conventional liquid crystal display device according to the comparative sample, the contact areas between the bottom plates 18 and the heat dissipation members 19 are more easily increased. The sample has a higher heat dissipation capability. To increase the heat dissipation capability of the conventional liquid crystal display device according to the comparative sample, the thickness of the backlight device needs to be increased. The heat dissipation capability of the liquid crystal display device 10 according to the sample can be enhanced without increasing the thickness of the backlight device 12.

As described above, the backlight device (a lighting device) 12 according to this embodiment includes the LEDs (light sources) 17, the light guide plate 16, the chassis 14, the LED boards (light source mounting members) 18, and the heat dissipation members 19. The light guide plate 16 includes the end surfaces opposite the LEDs 17 and configured as the light entrance surfaces 16b through which rays of light from the LEDs 17 enter. The light guide plate 16 further includes the plate surface configured as the light exit surface 16a through which light exits. The chassis 14 supports the other rear plate surface 16c of the light guide plate 16 opposite from the light exit surface 16a. Each LED board 18 includes a bottom plate 18b that extends parallel to at least the other rear plate surface 16c of the light guide plate 16. The heat dissipation members 19 extend parallel to the plate surfaces 18b1 of the respective bottom plates 18b and are in surface contact with the plate surfaces 18b1 of the bottom plates 18b.

With this configuration, the rays of light from the LEDs 17 enter the light guide plate 16 through the light entrance surfaces 16b, travel inside the light guide plate 16, and exit through the light exit surface 16a. The heat produced by the LEDs 17 while they are turned on is transmitted to the LED boards 18 and then to the heat dissipation members 19. As a result, the heat is dissipated. The heat dissipation members 19 are provided in addition to the chassis 14. In comparison to a chassis that has a function of the heat dissipation members 19, a material having a high heat dissipation capability can be freely selected for the heat dissipation members 19. Furthermore, a shape or an arrangement of the heat dissipation members 19 can be freely designed. Namely, design of a heat dissipation path is more flexible. Effects including the above can be achieved.

Each LED board 18 includes the bottom plate 18b that extends parallel to at least the other rear plate surface 16c of the light guide plate 16. The corresponding heat dissipation member 19 extends parallel to the plate surface 18b1 of the bottom plate 18b and is in surface contact with the plate surface 18b1 of the bottom plate 18b. In comparison to the conventional configuration in which the plate surface of the LED board and the plate surface of the heat dissipation member parallel to the end surface of the light guide plate are in contact with each other, the contact area of each heat dissipation member 19 with the LED boards 18 is easily expandable. In the conventional configuration, there is a limit to expand the contact area of the heat dissipation member with the LED board in limited space along the end surface of the light guide plate. When an expansion of the contact area is considered, an increase in dimension of the backlight unit in the thickness direction of the light guide plate is required. According to the configuration in which the heat dissipation members 19 extend along the bottom plates 18b of the LED boards 18, the contact areas of the heat dissipation members 19 with the LED boards 18 are expandable by increasing long dimensions of the heat dissipation members 19 and the bottom plates 18b without increasing the dimension of the backlight device 12 in the direction along the end surface of the light guide plate 16. Therefore, the heat is efficiently transmitted from the LEDs 17 to the heat dissipation members 19 via the LED boards 18 while the thickness of the backlight device 12 is maintained small. Namely, high heat dissipation efficiency can be achieved. According to this embodiment, high heat dissipation efficiency can be achieves while the thickness of the backlight device 12 is maintained small.

Each heat dissipation member 19 has a large dimension than the corresponding bottom plate 18b in the arrangement direction of the LEDs 17 and the light guide plate 16. The heat dissipation member 19 is arranged between the bottom plate 18b and the chassis 14. With this configuration, the heat generated by the LEDs 17 are transmitted to the bottom plates 18b of the LED boards 18 and then to the heat dissipation members 19. Because each heat dissipation member 19 has the large dimension then the corresponding bottom plate 18b in the arrangement direction of the LEDs 17 and the light guide plate 16, the heat transmitted thereto can be dissipated extensively in the arrangement direction. Furthermore, because each heat dissipation member 19 is arranged between the bottom plate 18b and the chassis 14, the heat dissipated extensively by the heat dissipation member 19 is transmitted to the chassis 14. Namely, the heat dissipation is enhanced by using the thermal capacity of the chassis 14 and the higher heat dissipation capability is achieved.

The LED boards (light source boards) 18 correspond to the light source mounting members on which the LEDs 17 are mounted and traces for supplying power to the LEDs 17 are formed. The LEDs 17 mounted on the LED boards 18 are configured to emit light when power is supplied through the traces. Because the LED boards 18 include the bottom plates 18b that are in surface contact with the heat dissipation members 19, the heat produced by the LEDs 17 while they are turned on is efficiently dissipated.

The LED boards 18 include the LED mounting portions 18a that project from the respective bottom plates 18b so as to oppose the respective light entrance surfaces 16b of the light guide plate 16 and on which the LEDs 17 and the traces are disposed. In comparison to a configuration in which the LEDs 17 and the traces are disposed on the bottom plates, the configuration of this embodiment is more preferable for using the LEDs 17 that are relatively large and a light emitting area thereof is large. The configuration is preferable for increasing the size of the backlight device 12.

The bottom plates 18b and the heat dissipation members 19 overlap the light guide plate 16 in a plan view at least in part. In comparison to a configuration in which the bottom plates and the heat dissipation members do not overlap the light guide plate 16 in a plan view, the configuration of this embodiment is more preferable for reducing the frame size of the backlight device 12.

The bottom plates 18b and the heat dissipation members 19 are sandwiched between the chassis 14 and the other rear plate surface 16c of the light guide plate 16. The bottom plates 18b and the heat dissipation members 19 are arranged inside the chassis 14. If the bottom plates and the heat dissipation members are arranged outside the chassis 14, dust or foreign substances may enter into the chassis 14 through a gap between the chassis 14 and the bottom plates 18b or the heat dissipation members 19. According to the configuration in which the bottom plates 18b and the heat dissipation members 19 are arranged inside the chassis 14, such a gap does not exist. Therefore, dust or foreign substances are less likely to enter into the chassis 14.

The chassis 14 includes the light guide plate supporting portion 14a and the holding portions 14b. The light guide plate supporting portion 14a is for supporting the other rear plate surface 16c of the light guide plate 16. Each holding portion 14b projects from the light guide plate supporting portion 14a in the direction opposite to the light guide plate 16 and holds the corresponding bottom plate 18b and the corresponding heat dissipation member 19. The heat dissipation members 19 are sandwiched between the respective bottom plates 18b and the respective holding portions 14b. The plate surfaces 19a1 of the heat dissipation members 19 opposite from the plate surfaces on the respective bottom plate 18b sides are in surface contact with the respective holding portions 14b. According to the configuration, the chassis 14 holds the bottom plates 18b and the heat dissipation members 19 with the holding portions 14b while supports the light guide plate 16 with the light guide plate supporting portion 14a. Because the plate surfaces 19a of the heat dissipation members 19 opposite from the plate surfaces on the respective bottom plate 18 sides are in surface contact with the respective holding portions 14b, the heat transmitted from the bottom plates 18b to the heat dissipation members 19 is efficiently transmitted to the holding portions 14b. Namely, a higher heat dissipation capability is achieved.

The liquid crystal display device (a display device) 10 according to this embodiment includes the above-described backlight device 12 and the liquid crystal panel (a display panel) 11. The liquid crystal panel 11 includes the display surface 11c configured to provide displays using light from the light exit surface of the light guide plate 16 included in the backlight device 12. According to such a liquid crystal display device 10, the backlight device 12 configured to provide the liquid crystal panel 11 with light has the high heat dissipation capability although the thickness of the backlight device 12 is maintained small. Effects including reducing the thickness of the liquid crystal display device 10 and improvement of operation reliability are exerted.

The liquid crystal display device 10 includes the outer frame (a frame-shaped member) 13 that form an external appearance thereof. The outer frame 13 is arranged on the display surface 11c side relative to the liquid crystal panel 11. The liquid crystal panel 11 is sandwiched between the outer frame 13 and the backlight device 12 and held therebetween. The outer frame 13 is arranged such that the LED boards 18 included in the backlight device 12 are not in contact with the outer frame 13. With this configuration, the heat generated by the LEDs 17 is less likely to be transmitted from the LED boards 18 to the outer frame 13. The temperature of the outer frame 13 may increase due to the heat; however, the temperature of the outer frame 13 is less likely to increase according to the above configuration. The outer frame 13 is arranged on the display surface 11c side of the liquid crystal panel 11 and forms the external appearance of the liquid crystal display device 10. Therefore, the outer frame 13 tends to contact external objects. Because the temperature of the outer frame 13 is less likely to increase, problems are less likely to occur even when the external objects contact the outer frame 13.

<Second Embodiment>

A second embodiment will be described with reference to FIGS. 7 and 8. The second embodiment includes LED boards 118 and heat dissipation members 119 arranged outside a chassis 114. Other configurations are similar to the first embodiment and thus configurations, functions, and effects of those will not be described.

Figure 7:
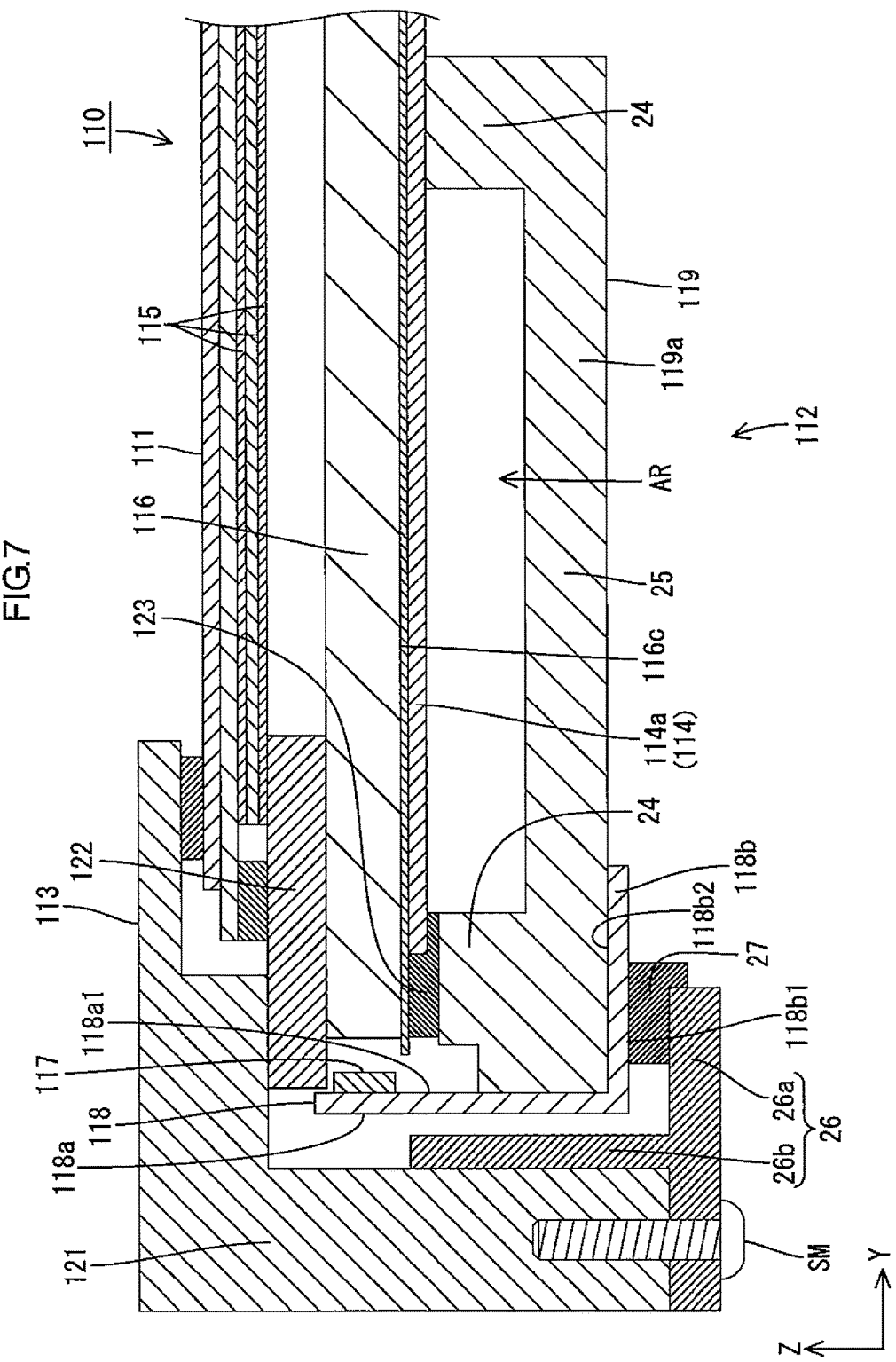
FIG. 7 is a cross-sectional view of a liquid crystal display device taken along a short-side direction thereof according to a second embodiment.
Figure 8:
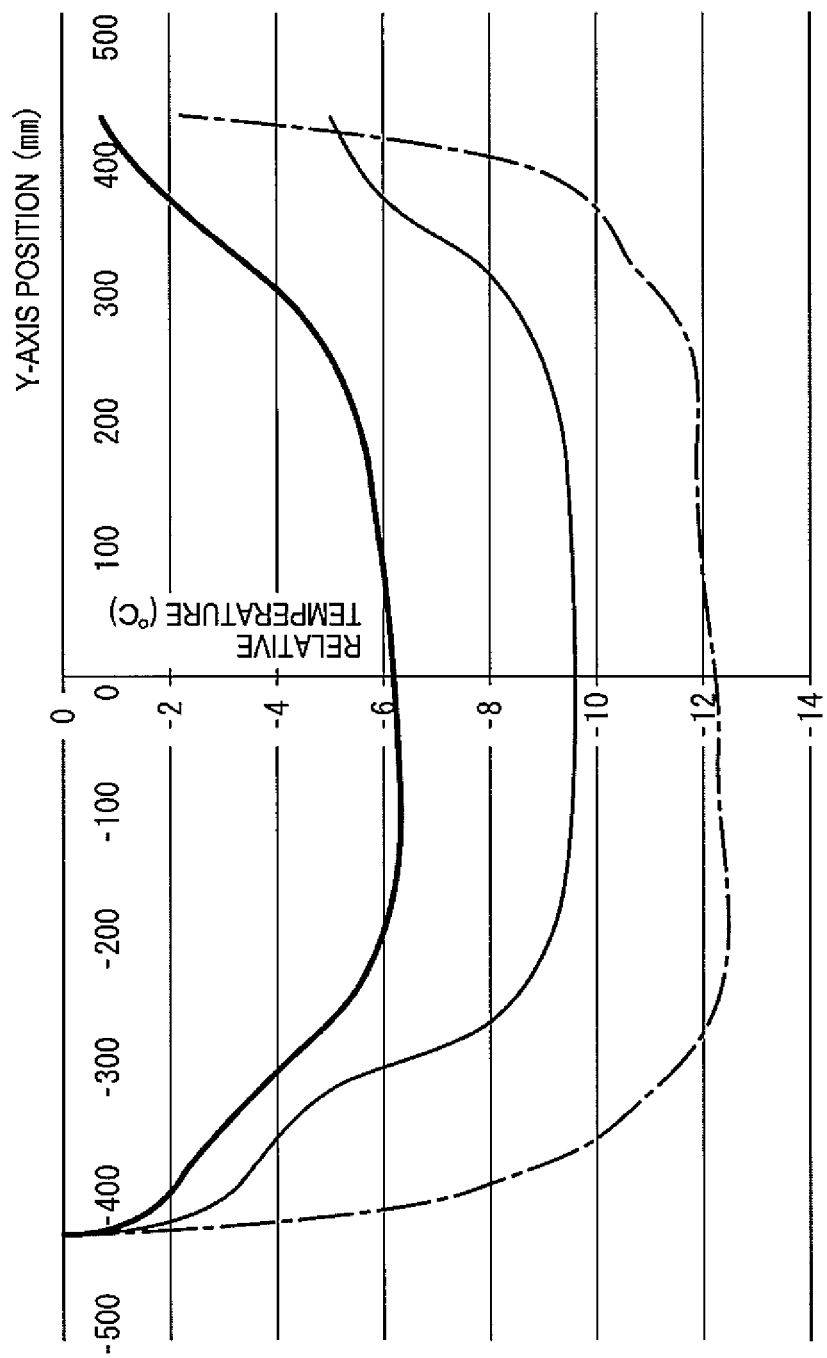
FIG. 8 is a graph illustrating relations between relative temperatures relative to a temperature at an end Y-axis position in the liquid crystal display device and Y-axis positions in the liquid crystal display device.

As illustrated in FIG. 7, in a backlight device 112 according to this embodiment, bottom plates 118b of the LED boards 118 and the heat dissipation members 119 are sandwiched between a board surface 116c of a light guide plate 116 and the chassis 114. Namely, the chassis 114 is arranged on the light guide plate 116 side in the Z-axis direction relative to the bottom plates 118b of the LED boards 118 and the heat dissipation members 119. The bottom plates 118b of the LED boards 118 and the heat dissipation members 119 are arranged outside the chassis 114. Specifically, the chassis 114 includes a light guide plate supporting portion 11a configured to support the plate surface 116c of the light guide plate 116 on the rear side for about an entire Y-axis dimension. The chassis 114 of this embodiment does not include the holding portions 14b and mounting portions 14c of the first embodiment.

As illustrated in FIG. 7, each heat dissipation member 119 includes a main heat dissipation portion 119a and chassis contact portions 24. The main heat dissipation portion 119a extends along a rear plate surface 116c of the light guide plate 116 and a rear plate surface of the light guide plate supporting portion 114a. The chassis contact portions 24 protrude from portions of the main heat dissipation portion 119a toward the front side and contact the rear plate surface of the light guide plate supporting portion 114a. The chassis contact portions 24 are located at ends of the main heat dissipation portion 119a with respect to the Y-axis direction, that is, at end close to the LEDs 117 and at end opposite from the LEDs 117. A middle section of the main heat dissipation portion 119a with respect to the Y-axis direction in which the chassis contact portions 24 are not located is opposite the rear surface of the light guide plate supporting portion 114a via an air layer AR. The middle section is referred to as a chassis non-contact portion 25 that does not contact the light guide plate supporting portion 114a. In comparison to a configuration in which an entire area of the main heat dissipation portion is in contact with the chassis 114, a contact area of the heat dissipation member 119 with the chassis 114 is smaller. Furthermore, because the air layer AR functions as a heat insulating layer, heat transmitted from the LED boards 118 to the main heat dissipation portions 119a of the heat dissipation members 119 is less likely to the light guide plate 116 via the chassis 114. Therefore, the temperature of the light guide plate 116 is less like to increase and thermal expansion or thermal deformation is less likely to occur. The chassis contact portion 24 on the LED 117 side is in contact with the end of the light guide plate 116 and the end of the chassis 114 via a cushioning member 123. The heat dissipation members 119 of this embodiment do not include mounting portions 19b of the first embodiment.

As illustrated in FIG. 7, each LED board includes an LED mounting portion 118a and a bottom plate 118b. The LED mounting portion 118a extends in the Z-axis direction toward the rear farther than the light guide plate 116 and the heat dissipation member 119. The bottom plate 118b that continues from an end of the LED mounting portion 118a on the rear side is overlaid on the rear surface of the heat dissipation member 119. The bottom plate 118b is arranged more to the rear than the heat dissipation member 119 that is arranged on the rear of the chassis 114, that is, at the outermost position in the backlight device 112. An entire area of a front plate surface 118b2 of the bottom plate 118b is in surface contact with the rear plate surface 119a of the main heat dissipation portion 119a of the heat dissipation member 119. Namely, the heat dissipation member 119 is sandwiched between the bottom plate 118b and the chassis 114. Because the bottom plates 118b of the LED boards 118 and the heat dissipation members 119 are arranged so as to be exposed to the outside of the chassis 114, heat transmitted from the LEDs 117 to the bottom plates 118a and the heat dissipation members 119 is efficiently dissipated into external air. Therefore, the heat is less likely to stay inside the chassis 114, that is, a higher heat dissipation capability is achieved. A portion of the plate surface (amounting surface 118a1) of each LED mounting portion 118a on the light guide plate 116 side and opposite the heat dissipation member 119 is in surface contact with the heat dissipation member 119 (a main heat dissipation member 119a).

As illustrated in FIG. 7, the liquid crystal display device 10 according to this embodiment includes a fixing members 26 for fixing the LED boards 118 and the heat dissipation members 119 as they are mounted. The fixing members 26 are made of metal or synthetic resin. The fixing members 26 hold down the bottom plates 118b of the LED boards 118 and the heat dissipation members 119 from the rear side (a side opposite to the chassis 114). The fixing members 26 are fixed to the screw mounting portions 121 of the outer frame 113. Each fixing member 26 includes a fixing member body 26a and a guide 26b. The fixing member body 26a extends in the Y-axis direction and faces the rear plate surface 118b1 of the bottom plate 118b and the rear surface of the screw mounting portion 121. The guide 26b protrudes from the fixing member body 26a toward the front side. The guide 26b is held to the inner surface of the screw mounting portion 121. A cross section of an overall shape of the fixing member 26 is a T shape. The fixing member body 26a has a screw insertion hole in which the screw SM is inserted. The screw insertion hole is located in a portion of the fixing member body 26a where the screw mounting portion 121 contacts. Through the screw insertion hole, the screw SM is screwed to the screw mounting portion 121. The fixing member body 26a holds down the rear plate surface 118b1 of the bottom plate 118b from the rear side via a heat insulating and cushioning member 27. An example of the heat insulating and cushioning member 27 is a urethane form. A heat conductivity of the heat insulating and cushioning member 27 is lower than those of the LED boards 118, the heat dissipation members 119, and the fixing members 26. The heat insulating and cushioning member 27 has a high cushioning ability. Heat generated by the LEDs 117 and transmitted to the bottom plate 118b of the LED board 118 is less likely to be transmitted to the fixing member 26 and the outer frame 113 to which the fixing member 26 is fixed. In the liquid crystal display device 110, the temperature of the outer frame 113 that forms the front external appearance is less likely to increase. Therefore, problems are less likely to occur even when the external objects contact the outer frame 13. The inner frame 122 is arranged between the light guide plate 116 and the liquid crystal panel 111 and an optical member 115.

A comparative experiment in which the liquid crystal display device 110 according to this embodiment and the liquid crystal display device 10 according to the first embodiment were compared will be described. In this experiment, the liquid crystal display device 10 according to the first embodiment, the liquid crystal display device 110 according to this embodiment, and the conventional liquid crystal display device were referred to as sample 1, sample 2, and a comparative sample, respectively. In this experiment, the liquid crystal display devices were maintained in operation for predetermined time and temperatures on the display surfaces of the liquid crystal panels were measured. FIG. 8 illustrates how the temperatures change according to Y-axis positions. In FIG. 8, the horizontal axis represents positions on the liquid crystal display device relative to the Y axis (in unit of mm) and the vertical axis represents relative temperatures (in unit of ° C.). The horizontal axis in FIG. 8 represents relative values defied with a value at the center Y-axis position on the liquid crystal display device as a reference (0 mm). The vertical axis represents relative temperatures with the highest temperature measured at the Y-axis position of one end (the left end in FIG. 8) as a reference (0° C.). In FIG. 8, a curve regarding sample 2 is illustrated with a thick solid line, a curve regarding sample 1 is illustrated with a thin solid line, and a curve regarding the comparative sample is illustrated with a one-dot chain line. The configurations of the liquid crystal display devices according to sample 1 and the comparative sample are as described in the first embodiment section.

Results of the comparative experiment will be described. As illustrated in FIG. 8, a temperature difference between high temperature regions at end Y-axis positions in which the temperature is relatively high and a low temperature region at a middle Y-axis position in which the temperature is relatively low is slightly over 6° C. The temperature difference is further smaller than the temperature difference in example 1, which is slightly under 10° C. Namely, the temperature increase is further controlled in sample 2 than in sample 1, and sample 2 has further higher heat dissipation capability. Another experiment, other than the above comparative experiment, was performed. In the experiment, the liquid crystal display devices according to sample 1, sample 2, and the comparative sample were maintained in operation for predetermined time and temperatures at the outer frames and areas of the LED boards near the LEDs (more specifically at soldering portions of lead terminals of the LEDs) were measured. Results of the experiment will be described. Regarding the temperatures at the outer frames, sample 2 was about 0.7° C. lower than sample 1. Regarding the temperatures at the areas of the LED boards near the LEDs, sample 2 was about 6.0° C. lower than sample 1. The liquid crystal display device 110 according to sample 2 has the configuration in which the bottom plates 118b of the LED boards 118 and the heat dissipation members 19 are arranged outside the chassis 114. Therefore, in comparison to the liquid crystal display device 10 according to sample 1, the liquid crystal display device 110 according to sample 2 has a further higher heat dissipation capability.

According to the backlight device 112 of this embodiment, the bottom plates 118b and the heat dissipation members 119 are arranged such that the chassis 114 is sandwiched between the other plate surface 116c of the light guide plate 116 and those. Because the bottom plates 118b and the heat dissipation members 119 are arranged outside the chassis 114, heat transmitted from the LEDs 117 to the bottom plates 118*b* and the heat dissipation members 119 is efficiently dissipated to the outside the chassis 114. Therefore, the heat is less likely to stay inside the chassis 114 and the high heat dissipation capability is achieved.

The bottom plates 118*b* are arranged such that the heat dissipation members 119 are sandwiched between the chassis 114 and the bottom plates 118*b*. Because the bottom plates 118*b* to which the heat from the LEDs 117 is transmitted first are arranged on a side of the heat dissipation member 119 opposite from the chassis 114, the heat is further efficiently dissipated to the outside of the chassis 114 through the bottom plates 118*b*.

Each heat dissipation members 119 includes the chassis contact portions 24 and the chassis non-contact portion 25. The chassis contact portions 24 are in contact with the plate surface of the chassis 114 away from the light guide plate 116. The chassis non-contact portion 25 is opposed to the plate surface of the chassis 114 away from the light guide plate 116 via the air layer AR. Because each heat dissipation member 119 includes the chassis contact portions 24 and the chassis non-contact portion 25, in comparison to a configuration that does not include the chassis non-contact portions, the contact area of the heat dissipation members 119 and the chassis 114 is smaller. Furthermore, the air layer AR between the chassis non-contact portions 25 and the chassis 114 functions as a heat insulating layer. Therefore, heat is less likely to be transmitted from the heat dissipation members 119 to the light guide plate 116 via the chassis 114. With this configuration, the temperature of the light guide plate 116 is less likely to increase and thermal expansion or thermal deformation is less likely to occur.

In the backlight device 112 of the liquid crystal display device 110 according to this embodiment, the bottom plates 118*b* and the heat dissipation members 119 are arranged such that the chassis 114 is sandwiched between the other plate surface 116*c* of the light guide plate 116 and the bottom plates 118*b* and the heat dissipation members 119. The liquid crystal display device 110 according to this embodiment includes the fixing members 26 that hold down the bottom plates 118*b* and the heat dissipation members 119 from the sides thereof opposite from the chassis 114. The fixing members 26 are fixed to the outer frame 113. The fixing members include the contact portions (the heat insulating and cushioning members 27) which contact at least the bottom plates 118*b* and the heat dissipation members 119. The contact portions have the heat conductivity lower than those of the bottom plates 118*b* and the heat dissipation portions 119. Because the bottom plates 118*b* and the heat dissipation members 119 are arranged outside the chassis 114 in the backlight device 112, heat transmitted from the LEDs 117 to the bottom plates 118*b* and the heat dissipation members 119 is efficiently dissipated to the outside of the chassis 114. Therefore, the heat is less likely to stay inside the chassis 114 and the high heat dissipation capability is achieved. Furthermore, the fixing members 26 hold down the bottom plates 118*b* and the heat dissipation members 119 from the sides thereof opposite from the chassis 114. The fixing members 26 are fixed to the outer frame 113. The contact portions that contact at least the bottom plates 118*b* and the heat dissipation members 119 have the heat conductivity lower than those of the bottom plates 118*b* and the heat dissipation portions 119. Heat is less likely to be transmitted from the bottom plates 118*b* of the heat dissipation members 119 to the outer frame 113 via the fixing members 26. Therefore, the temperature of the outer frame 113 is further less likely to increase while the bottom plates 118*b* and the heat dissipation members 119 are properly held.

<Third Embodiment>

A third embodiment will be described with reference to FIG. 9. The third embodiment includes LED boards 218 having different configurations from the first embodiment. Other configurations are similar to the first embodiment and thus configurations, functions, and effects of those will not be described.

As described in FIG. 9, each LED board 218 according to this embodiment includes a bottom plate 218*b* parallel to a rear plate surface 216*c* of alight guide plate 216. LEDs 217 and traces are on the bottom plates 218. Each LED 217 is a side emitting type LED including a side surface adjacent to a mounting surface thereof on the corresponding LED board 218 is configured as a main light emitting surface 217*a*. Even the LED boards 218 have such a configuration, a sufficiently high heat dissipation capability can be achieved with rear plate surfaces 218*b*1 of the bottom plates 218*b* in surface contact with main heat dissipating portions 219*a* of heat dissipation members 219.

<Fourth Embodiment>

A fourth embodiment will be described with reference to FIG. 10. The fourth embodiment includes LED boards 318 and heat dissipation members 319 arranged differently from the second embodiment. Other configurations are similar to the second embodiment and thus configurations, functions, and effects of those will not be described.

As illustrated in FIG. 10, bottom plates 318*b* of the LED boards 318 are arranged between a chassis 314 and heat dissipation members 319. The bottom plates 318*b* are arranged outside the chassis 314 on the rear side and closer to the chassis 314 than the heat dissipation members 319. The heat dissipation members 319 are arranged further out on the rear side than the bottom plates 318*b*, that is, at the outermost position in the backlight device 312. The heat dissipation members 319 are held down by fixing members 326 from the rear side via heat insulating and cushioning members 327. Even the LED boards 318 have such a configuration, a high heat dissipation capability similar to the second embodiment can be achieved with the bottom plates 318*b* and the heat dissipation members 319 arranged outside the chassis 314 because heat is less likely to stay inside the chassis 314.

<Fifth Embodiment>

A fifth embodiment will be described with reference to FIG. 11. The fifth embodiment has the same configurations as those of the second embodiment except for the inner frame that is not included in this embodiment. The same configurations, functions, and effects as those the second embodiment will not be described.

As illustrated in FIG. 11, a liquid crystal display device 410 or a backlight device 412 according to this embodiment does not include an inner frame. An optical member 415 is directly placed on a light exit surface 416*a* of a light guide plate 416. Namely, a liquid crystal panel 411, the optical member 415, and the light guide plate 416 are layered substantially no gaps therebetween, that is, closely attached to each other and held between an outer frame 413 on the front side and a chassis 414 on the rear side. Because an air layer does not exist between the light guide plate 416 and the optical member 415, higher display quality is achieved. This configuration is preferable for reducing the thickness.

<Other Embodiments>

The present invention is not limited to the embodiments described above and illustrated by the drawings. For examples, the following embodiments will be included in the technical scope of the present invention.

(1) In the first and the third embodiments, the heat dissipation members may be sandwiched between the bottom plates and the light guide plates.

(2) The configuration of the fifth embodiment may be applied to those of the first and the third embodiments, that is, the inner frame may be omitted.

(3) The number, the Y-axis positions, and the cross section of the chassis contact portions of each heat dissipation member in the second, the fourth, and the fifth embodiments may be altered as appropriate.

(4) The configuration of the second embodiment maybe applied to those of the second, the fourth, and the fifth embodiments, that is, the LED mounting portions of the LED boards may be omitted and the side emitting type LEDs may be mounted on the bottom plates.

(5) The heat insulating and cushioning members in the second, the fourth, and the fifth embodiments may be omitted. Instead, entire areas of the fixing members or areas of the fixing members in contact with the bottom plates or the heat dissipation members may be made of material having thermal conductivity lower than that of the bottom plates or the heat dissipation members.

(6) In the second, the fourth, and the fifth embodiments, the chassis contact portions may be formed in entire areas of the heat dissipation members. With the configurations, air layers do not exist between the heat dissipation members and the chassis and thus the entire areas of the heat dissipation members are in contact with the chassis.

(7) In the above embodiments (except for the fourth embodiment), the heat dissipation members are arranged between the bottom plates of the LED boards and the chassis. However, the bottom plates of the LED boards may be in direct contact with the chassis (i.e., the bottom plates may be arranged between the heat dissipation members and the chassis). With the configuration, heat is transmitted from the LED boards to the chassis and then to the heat dissipation members.

(8) In the above embodiments, the bottom plates of the LED boards are fixed to the heat dissipation members with the fixing members. However, the fixing member may be omitted and the bottom plates may not be fixed to the heat dissipation members. The bottom plates may be fixed to the heat dissipation members with screws or clips instead of the fixing members.

(9) In the above embodiments, each eat dissipation member extends in the Y-axis direction farther than the bottom plate. However, each heat dissipation member and the corresponding bottom plate may have substantially the same dimension in the Y-axis direction or the heat dissipation member may have a smaller dimension in the Y-axis direction than the bottom plate.

(10) In the above embodiments (except for the second embodiment), the traces are formed on the LED mounting portions of the LED boards. However, the traces may be formed on the bottom plates of the LED boards including the LED mounting portions on which the LEDs are mounted.

(11) In the above embodiments (except for the fifth embodiment), the optical members are arranged more to the front side than the inner frame. However, the optical members may be directly placed on the light exit surface of the light guide plate, that is, arranged more to the rear side than the inner frame. In this case, the optical members and the light guide plates that are layered are held down by the inner frame from the front side and the optical members are included in the backlight device.

(12) In the above embodiments, two LED board are attached to one heat dissipation member. However, one LED board or three or more LED boards may be attached to one heat dissipation member.

(13) In the above embodiments, the end surfaces of the light guide plate at the ends of the long dimension thereof are configured as the light entrance surfaces. However, the LED units may be arranged such that light enters through end surfaces of the light guide plate at ends of the short dimension thereof.

(14) In the above embodiments, a pair of the LED units arranged such that the light guide plate is sandwiched therebetween in the short-side direction of the light guide plate is provided. However, a configuration in which an LED unit is arranged on one of the sides of the light guide plate may be included in the scope of the present invention. In this case, the LED unit may be arranged opposite one of the end surfaces on the long side of the light guide plate or one of the end surfaces on the short side of the light guide plate.

(15) A configuration in which LED units are arranged opposite three of the end surfaces of the light guide plate or all four end surfaces of the light guide plate may be included in the scope of the present invention other than the above (13) and (14).

(16) In the above embodiments, the outer frame and the chassis form the external appearance of the liquid crystal display device. However, a configuration including an extra external component attached to the rear surface of the chassis such that the chassis is not exposed to the outside may be included in the scope of the present invention. Furthermore, a configuration including an extra external component that collectively covers the outer frame and the chassis such that the outer frame and the chassis are not exposed to the outside may be included in the scopes of the present invention.

(17) In the above embodiments, the chassis and the outer frame that form the external appearance are made of metal. However, either one of the chassis and the outer frame or both of them may be made of synthetic resin. This configuration is preferable for small to middle sized liquid crystal display devices, requirements of mechanical strength of which are not very high.

(18) In the above embodiments, the power supply board is configured to supply power to the LEDs. However, a configuration including a separate LED driver board configured to supply power to the LEDs from the power supply board may be included in the scope of the present invention.

(19) In the above embodiments, the main board includes the tuner. A configuration including a separated tuner board that includes a tuner from the main board may be included in the scope of the present invention.

(20) In the above embodiments, the liquid crystal panel includes the color portions of the color filters in three colors of R, G and B. However, the liquid crystal panel may include four or more colors of color portions.

(21) In the above embodiments, the LEDs are used as light sources. However, organic ELs or other types of light sources may be used.

(22) In the above embodiments, the TFTs are used as switching components of the liquid crystal display device. The scope of the present invention is applicable for a liquid crystal display device that includes switching components other than the TFTs (e.g., thin film diodes (TFDs)). However, the scope of the present invention is applicable for black and white liquid crystal display devices other than the color liquid crystal display device.

(23) In each of the above embodiments, the liquid crystal display device that includes the liquid crystal panel as a display panel is used as an example. However, the scope of the present invention is applicable for display devices that include other types of display panels.

(24) In each of the above embodiments, the television device that includes the tuner is used as an example. However, the scope of the present invention is applicable for display devices without tuners. For example, the scope of the present invention is applicable for liquid crystal display devices configured as digital signages or interactive whiteboards.

EXPLANATION OF SYMBOLS 10, 110, 410: liquid crystal display device (display device), 11, 111, 411: liquid crystal panel (display panel), 11c: display surface, 12, 112, 312, 412: backlight device (lighting device), 13, 113, 413: outer frame (frame-shaped member), 14, 114, 314, 414: chassis, 14a, 114a: light guide plate supporting portion, 14b: holding space, 16, 116, 416: light guide plate, 16a, 416a: light exit surface, 16b: light entrance surface, 16c, 116c: plate surface, 17, 117, 217: LED (light source), 18, 118, 218, 318: LED board (light source mounting member), 18a, 118a: LED mounting portion (light source mounting portion), 18b, 118b, 218b, 318b: bottom plate, 18b1: plate surface, 19, 119, 219, 319: heat dissipation member, 19a1: plate surface, 24: chassis contact portion, 25: chassis non-contact area, 26, 326: fixing member, 27, 327: insulating and cushioning member (contact area), AR: air layer, TV: a television device.

The invention claimed is:

1. A lighting device, comprising:
   a light source;
   a light guide plate including an end surface and a plate surface, the end surface being arranged opposite the light source and configured as a light entrance surface through which light enters, the plate surface being configured as a light exit surface through which light exits;
   a chassis supporting another plate surface of the light guide plate, the other plate surface being opposite from the light exit surface;
   a light source mounting member on which the light source is mounted, the light source mounting member including a bottom plate that extends parallel to at least the other plate surface of the light guide plate; and
   a heat dissipation member extending parallel to a plate surface of the bottom late and being in surface contact with the plate surface of the bottom plate; wherein
   the bottom plate and the heat dissipation member are arranged such that the chassis is sandwiched between the other plate surface of the light guide plate and the bottom plate and the heat dissipation member,
   the heat dissipation member includes a chassis contact portion and a chassis non-contact portion,
   the chassis contact portion contacts a plate surface of the chassis opposite from the light guide plate, and
   the chassis non-contact portion is opposite the plate surface of the chassis opposite from the light guide plate via an air layer.

2. The lighting device according to claim 1, wherein the light source mounting member is a light source board on which the light source is mounted and a trace for supplying power to the light source is formed.

3. The lighting device according to claim 2, wherein the light source board includes a light source mounting portion that projects from the bottom plate so as to oppose the light entrance surface of the light guide plate and on which the light source and the trace are arranged.

4. The lighting device according to claim 1, wherein the bottom plate and the heat dissipation member overlap each other at least in part in a plan view.

5. The lighting device according to claim 1, wherein the bottom plate is arranged such that the heat dissipation member is sandwiched between the bottom plate and the chassis.

6. A display device comprising:
   the lighting device according to claim 1; and
   a display panel configured to display an image using light from the light exit surface of the light guide plate included in the lighting device.

7. The display device according to claim 6, further comprising a frame-shaped member arranged on a display surface side of the display panel and holding the display panel such that the display panel is sandwiched between the frame-shaped member and the lighting device, the frame-shaped member forming an external appearance of the display device, wherein
   the light source mounting member in the lighting device is arranged so as not to contact the frame-shaped member.

8. The display device according to claim 7, wherein
   the bottom plate and the heat dissipation member are arranged in the lighting device such that the chassis is sandwiched between the other plate surface of the light guide plate and the bottom plate and the heat dissipation member,
   the display device further comprises a fixing member that holds down the bottom plate and the heat dissipation member from an opposite side from the chassis and is fixed to the frame-shaped member, wherein
   at least a portion of the fixing member in contact with the bottom plate or the heat dissipation member has thermal conductivity lower than those of the bottom plate and the heat dissipation member.

9. The display device according to claim 6, wherein the display panel includes a pair of substrates and liquid crystals sealed between the substrates.

10. A television device comprising the display device according to claim 6.

* * * * *